(12) United States Patent
Peach et al.

(10) Patent No.: US 8,714,375 B2
(45) Date of Patent: May 6, 2014

(54) AUTO-RACK RAILROAD CAR VEHICLE WHEEL CHOCK HANGER

(75) Inventors: Walter J. Peach, Montgomery, IL (US);
John D. Anderson, Oswego, IL (US);
Edward L. Vechiola, Lombard, IL (US)

(73) Assignee: Standard Car Truck Company, Park Ridge, IL (US)

( * ) Notice: Subject to any disclaimer, the term of this patent is extended or adjusted under 35 U.S.C. 154(b) by 66 days.

(21) Appl. No.: 12/908,352

(22) Filed: Oct. 20, 2010

(65) Prior Publication Data

US 2012/0097624 A1    Apr. 26, 2012

(51) Int. Cl.
*A47F 5/08* (2006.01)
*B60P 3/06* (2006.01)
*B60P 3/077* (2006.01)

(52) U.S. Cl.
CPC ........... *B60P 3/077* (2013.01); *A47F 5/083* (2013.01); *A47F 5/0807* (2013.01)
USPC ............................................ 211/106; 410/30

(58) Field of Classification Search
CPC ... A47F 5/083; A47F 5/0807; B65B 67/1266; B60P 3/077
USPC ........... 211/106, 106.01, 87.01, 85.31, 181.1, 211/70.6; 410/2, 3, 7, 8, 9, 19, 30, 47, 49; 248/220.21, 220.31, 220.41, 220.42, 248/220.43
See application file for complete search history.

(56) References Cited

U.S. PATENT DOCUMENTS

| | | | | |
|---|---|---|---|---|
| 3,294,351 A | * | 12/1966 | Rollins, Jr. | 248/243 |
| 3,861,125 A | * | 1/1975 | Hagemeister | 53/390 |
| 4,146,204 A | * | 3/1979 | Thalenfeld | 248/220.41 |
| 4,169,415 A | | 10/1979 | Winsor | |
| 4,340,144 A | * | 7/1982 | Cousins | 211/106.01 |
| 4,398,689 A | * | 8/1983 | Prader | 248/99 |
| 4,750,694 A | * | 6/1988 | Bateman | 248/97 |
| 4,842,230 A | * | 6/1989 | Cobb et al. | 248/220.21 |
| 4,858,862 A | * | 8/1989 | Prader | 248/99 |
| 4,913,001 A | | 4/1990 | Watanabe et al. | |
| 4,964,347 A | | 10/1990 | Long et al. | |
| 5,160,052 A | * | 11/1992 | Wudka | 211/90.02 |
| 5,190,253 A | * | 3/1993 | Sable | 248/97 |
| 5,302,063 A | | 4/1994 | Winsor | |
| 5,311,823 A | | 5/1994 | Rudibaugh et al. | |
| 5,312,213 A | * | 5/1994 | Winsor | 410/9 |
| 5,362,077 A | * | 11/1994 | Adamson | 280/33.992 |
| 5,375,534 A | | 12/1994 | Adams | |
| 5,551,654 A | * | 9/1996 | McNerney | 248/99 |
| 5,667,173 A | * | 9/1997 | Wilfong et al. | 248/100 |
| 5,694,859 A | | 12/1997 | Burke et al. | |
| 5,975,818 A | | 11/1999 | Burke et al. | |
| 6,070,747 A | * | 6/2000 | Shea | 211/87.01 |
| 6,299,001 B1 | * | 10/2001 | Frolov et al. | 211/106 |

(Continued)

OTHER PUBLICATIONS

Emhart Technologies, Well Nut Inch Threaded Inserts, Shelton, CT, available prior to Nov. 19, 2010.

*Primary Examiner* — Darnell Jayne
*Assistant Examiner* — Hiwot Tefera
(74) *Attorney, Agent, or Firm* — Neal, Gerber & Eisenberg LLP

(57) ABSTRACT

A vehicle wheel chock hanger for a vehicle restraint system for an auto-rack railroad car that is configured to hold various different chocks that are configured to secure vehicles in auto-rack railroad cars.

5 Claims, 21 Drawing Sheets

(56) References Cited

U.S. PATENT DOCUMENTS

| | | | |
|---|---|---|---|
| 6,328,511 B1 * | 12/2001 | Cardona | 410/12 |
| 6,471,079 B2 * | 10/2002 | Berlingieri | 211/105.3 |
| 6,553,917 B1 | 4/2003 | Burke et al. | |
| 6,561,740 B1 | 5/2003 | Burke et al. | |
| 6,607,169 B1 * | 8/2003 | Gershfeld | 248/65 |
| 7,150,592 B2 | 12/2006 | Anderson et al. | |
| 7,387,213 B1 * | 6/2008 | Smalley | 211/106 |
| 7,886,917 B1 * | 2/2011 | Berger | 211/85.31 |
| 7,954,656 B1 * | 6/2011 | Cuzzocrea | 211/189 |
| 8,292,094 B2 * | 10/2012 | Morton | 211/64 |
| 2004/0000528 A1 * | 1/2004 | Nagel | 211/59.3 |
| 2008/0169255 A1 * | 7/2008 | Kokenge et al. | 211/106.01 |
| 2008/0232919 A1 | 9/2008 | Anderson et al. | |
| 2009/0035088 A1 * | 2/2009 | Powers et al. | 410/30 |
| 2010/0314507 A1 * | 12/2010 | Laitila et al. | 248/97 |

\* cited by examiner

AUTO-RACK RAILROAD CAR VEHICLE WHEEL CHOCK HANGER

BACKGROUND

The railroad industry employs a variety of auto-rack railroad cars for transporting newly-manufactured vehicles such as automobiles, vans and trucks. Auto-rack railroad cars, known in the railroad industry as auto-rack cars, often travel thousands of miles through varying terrain. One typical type of auto-rack car is compartmented, having two or three floors or decks, two sidewalls, a pair of doors at each end, and a roof. Newly manufactured vehicles are loaded into and unloaded from an auto-rack car for transport by a person (sometimes called a "loader") who drives the vehicles into or out of the auto-rack car.

One problem with auto-rack cars is the potential for damage to newly manufactured vehicles. This damage can occur to vehicles being transported in the auto-rack car due to the unwanted movement of one or more of the transported vehicles not adequately secured in the auto-rack car. Over the years, various vehicle restraint systems have been developed for securing the vehicles transported in auto-rack cars to prevent movement or shifting of those vehicles during transportation.

One widely commercialized vehicle restraint system for restraining vehicles transported in auto-rack cars is disclosed in detail in U.S. Pat. Nos. 5,312,213 and 5,302,063, which are sometimes referred to herein as the Holden patents. This vehicle restraint system utilizes four restraints, one associated with each of the four wheels of a vehicle being transported. Each vehicle restraint of this vehicle restraint system is sometimes referred to herein as the Holden Restraint. Each Holden Restraint is detachably secured to a grating provided on a support surface of the auto-rack car. After driving the vehicle into the auto-rack car, the loader positions one of the restraints adjacent to each wheel of the vehicle. Prior to unloading the transported vehicles at their destination, a different loader removes these vehicle restraints from the positions adjacent to the wheels. If the vehicle restraints are left on the floor or gratings of the auto-rack car when vehicles are being loaded or unloaded, the vehicles can run over these vehicle restraints and cause damage to the vehicles as well as to these vehicle restraints. It is therefore very important that the vehicle restraints are moved out of the way of the vehicles when the vehicle restraints are not in use (i.e., not restraining a vehicle) to prevent this damage to the vehicles (moving into or out of the auto-rack car) as well as to prevent damage to these vehicle restraints. Typically, when not in use each vehicle restraint is placed in a storage pan that is secured to one of the side walls of the auto-rack car. One such storage pan is shown in the Holden patents. Storage pans are widely commercially employed in auto-rack cars.

It is important that the stored chocks are securely held in their respective stored positions during normal movement of an empty auto-rack car (i.e., one that is not transporting vehicles) and also during switching in a railroad yard where the auto-rack cars are coupled and decoupled with other railroad cars in different freight trains. During the coupling action, severe jolts of up to 8 to 10 miles per hour can be incurred by the auto-rack car even though regulations (and signs in the railroad yards and on the railroad cars) limit the speed to no more than 4 miles per hour.

While the above described vehicle restraint system has been widely commercialized, in many instances this vehicle restraint system does not adequately protect the vehicles or prevent the movement of the vehicles and does not prevent damage to the vehicles or the vehicle restraints themselves. Certain of the problems with these commercially implemented vehicle restraints are explained in U.S. Patent Application Publication No. 2008/0232919, filed Mar. 14, 2008, published Sep. 25, 2008, and which is sometimes referred to herein as the Anderson Application. The automobile industry and the railroad industry have sought new and improved vehicle restraint systems that solve these problems.

One new vehicle restraint system that is currently being tested is disclosed in the Anderson Application. This new vehicle restraint system includes chocks that also attach to the grating. These chocks are sometimes referred to herein as the Anderson Chock(s). The Anderson Chocks are substantially different than the Holden Restraints disclosed in the Holden patents. It is anticipated that these new vehicle chocks will soon be commercially employed in auto-rack cars.

FIGS. 28, 29, 32 to 35, 38, 39, and 43 to 46 of the Anderson Application illustrate one embodiment of the Anderson Chock, which includes storage clasps configured to enable that chock to be stored in the commercially implemented storage pan for holding the Holden Restraint.

FIGS. 47 to 57 of the Anderson Application illustrate another embodiment of Anderson Chock that does not include these storage clasps. FIGS. 58 to 60 of Anderson Application disclose a bracket for assisting to hold the Anderson Chock in the commercially implemented storage pan for the Holden Restraint and which is attached to a side wall of an auto-rack railroad car. One concern with these brackets is that they can be lost or removed, especially if a Holden Restraint is stored in this storage pan and this bracket is not needed.

It is anticipated that when the Anderson Chock becomes widely commercially employed, that: (a) certain auto-rack cars that currently include the Holden Restraints will still only be equipped with these Holden Restraints, (b) certain auto-rack cars that currently include the Holden Restraints will be equipped with the Anderson Chocks, (c) certain auto-rack cars will include both the Holden Restraints and the Anderson Chocks, and (d) it is possible that Anderson Chocks in certain auto-rack cars will be replaced with Holden Chocks. It should thus be appreciated that the various combinations of use of these different chocks in auto-rack cars are expected to occur in the future. It is also known that additional vehicle restraints or chocks that are configured to be attached to the gratings are being developed. If these additional chocks are commercially implemented, the variety and combinations of different chocks in auto-rack cars will significantly increase.

One problem with the commercially implemented storage pan employed for the Holden Restraint is that it is not well suited to securely hold all of these different vehicle wheel restraints or chocks when such restraints or chocks are not in use. The railroads and automobile manufacturers do not want to replace the storage devices for these chocks every time they employ different vehicle wheel restraints or chocks in an auto-rack railroad car.

Accordingly, there is a need for a device configured to hold the multiple different types of vehicle restraints or chocks in auto-rack cars including the Holden Restraints, Anderson Chocks, and other commercialized restraints or chocks (which are attachable to gratings) when these restraints or chocks are not in use.

SUMMARY

The present invention solves the above problems by providing a universal vehicle wheel chock hanger for an auto-rack car that is configured to hold multiple different types of vehicle wheel chocks including, but not limited to, the Holden Restraints (as described above) and the Anderson Chocks (as described above). More specifically, in one embodiment, the universal vehicle wheel chock hanger is configured to be attached to the inner surface of a side wall panel of the auto-rack car and is configured to hold a vehicle wheel chock that includes a body having a front portion and a rear portion, a tire engaging assembly at the front portion of the body for engaging the tire of a vehicle, front grate engagers for securing the chock to the grating when the chock is in use, and a locking assembly connected to the central or rear portion of the body and including rear grate engagers for securing the chock to the grating when the chock is in use.

In one embodiment, the universal vehicle wheel chock hanger includes a mounting base configured to be attached to the sidewall panel of an auto-rack car and a rack connected to the mounting base and configured to hold multiple different chocks (at different times). The rack generally includes a plurality of front grate engager holders, a plurality of rear grate engager holders, and a plurality of holder supports connected to the front grate engager holders and the rear grate engager holders. The front grate engager holders are configured to hold or support the front grate engagers of the vehicle wheel chock and the rear grate engager holders are configured to hold or support the rear grate engagers of the vehicle wheel chock when the chock is mounted to vehicle wheel chock hanger for storage.

In another embodiment, the vehicle wheel chock hanger is configured to co-act with the existing storage pan (as described above) to hold a vehicle wheel chock when the chock is not in use. The storage pan includes a pan and a cross bar connected to the pan and extending across a top part of the pan. This pan is configured to hold the Holden Restraint, but is not suitably configured to hold the Anderson Chock or other chocks. This embodiment of the vehicle wheel chock hanger is configured to be mounted in the lower portion of the pan and generally includes a mounting base and a rack attached to the mounting base. The rack includes a plurality of front grate engager holders and a plurality of holder supports connected to the front grate engager holders. In this embodiment, the front grate engager holders are configured to hold or support the front grate engagers of the vehicle wheel chock and the crossbar of the storage pan is configured to hold or support the rear grate engagers of the vehicle wheel chock when the chock is mounted to the combination of this vehicle wheel chock hanger and storage pan.

Other objects, features and advantages of the present invention will be apparent from the following detailed disclosure, taken in conjunction with the accompanying sheets of drawings, wherein like reference numerals refer to like parts.

DETAILED DESCRIPTION

Figure 1:
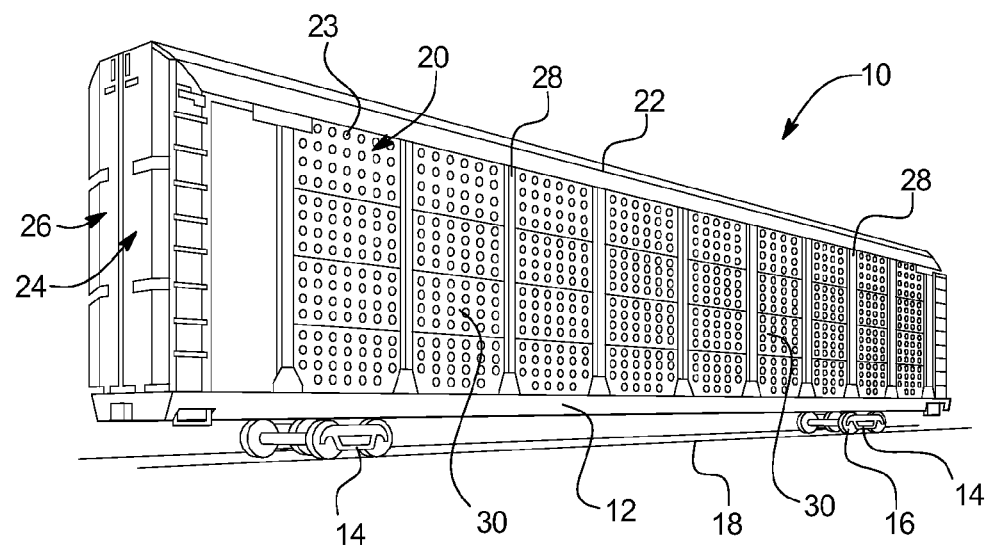
FIG. 1 is a perspective view of an auto-rack railroad car configured to transport a plurality of vehicles.
Figure 2:
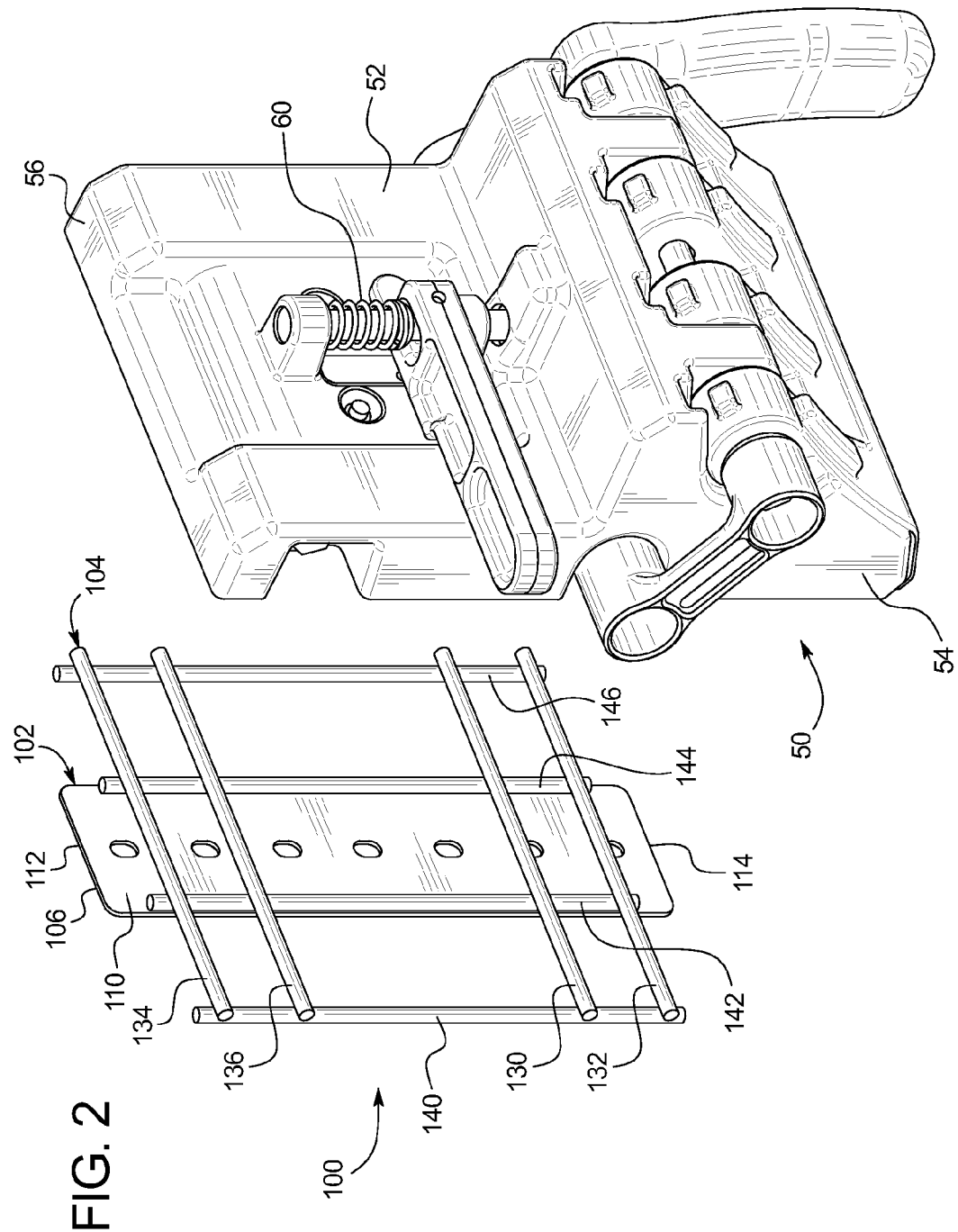
FIG. 2 is a perspective view of one embodiment of the vehicle wheel chock hanger and a vehicle wheel chock configured to be attached to the vehicle wheel chock hanger, which illustrates the vehicle wheel chock hanger prior to mounting on a side wall panel of an auto-rack railroad car, and which illustrates a vehicle wheel chock prior to attachment to the vehicle wheel chock hanger.
Figure 3:
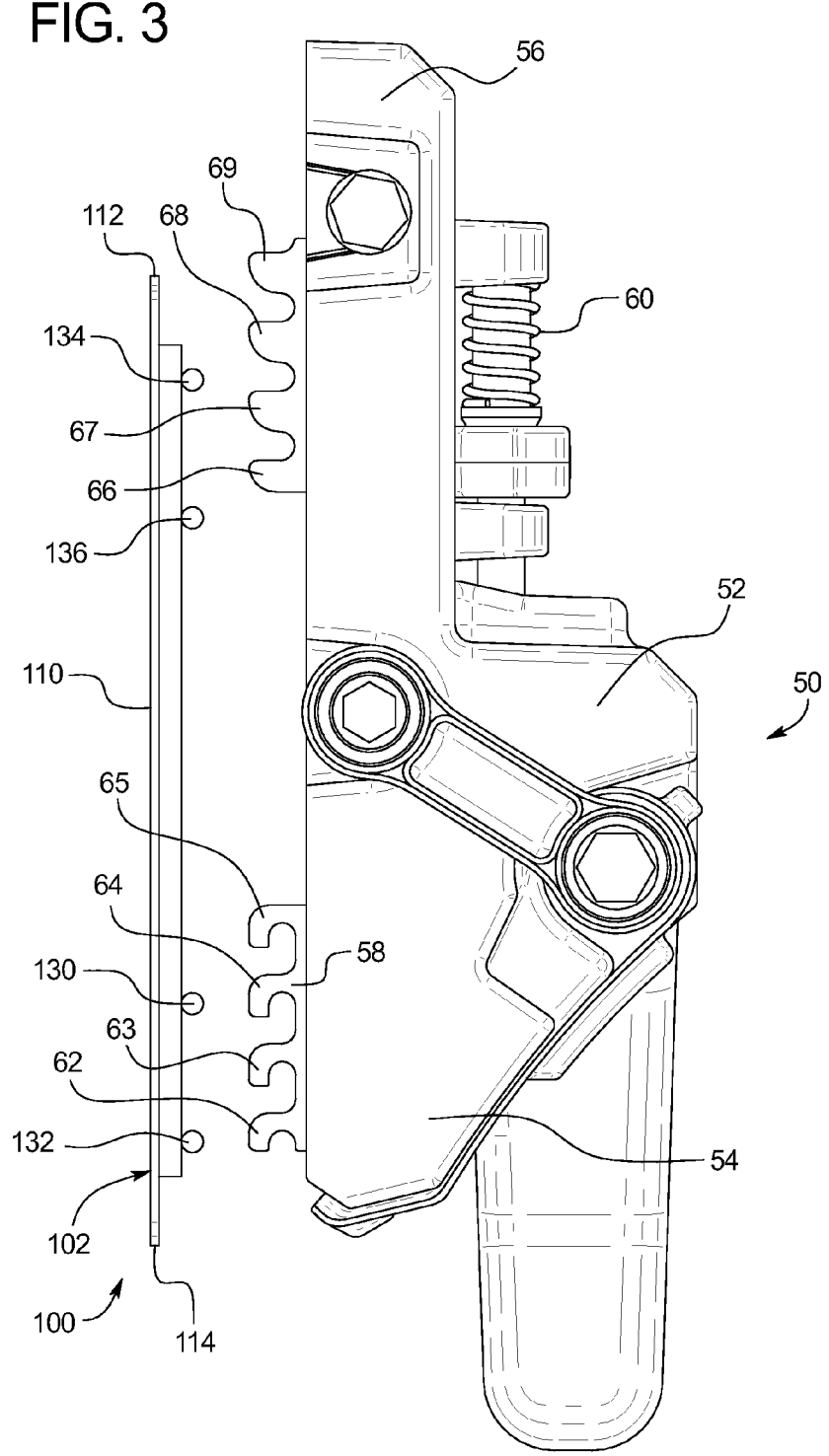
FIG. 3 is a side view of the vehicle wheel chock hanger of FIG. 2 and the vehicle wheel chock of FIG. 2, which illustrates the vehicle wheel chock hanger prior to mounting on a side wall panel of an auto-rack railroad car, and which illustrates the vehicle wheel chock prior to attachment to the vehicle wheel chock hanger.
Figure 4:
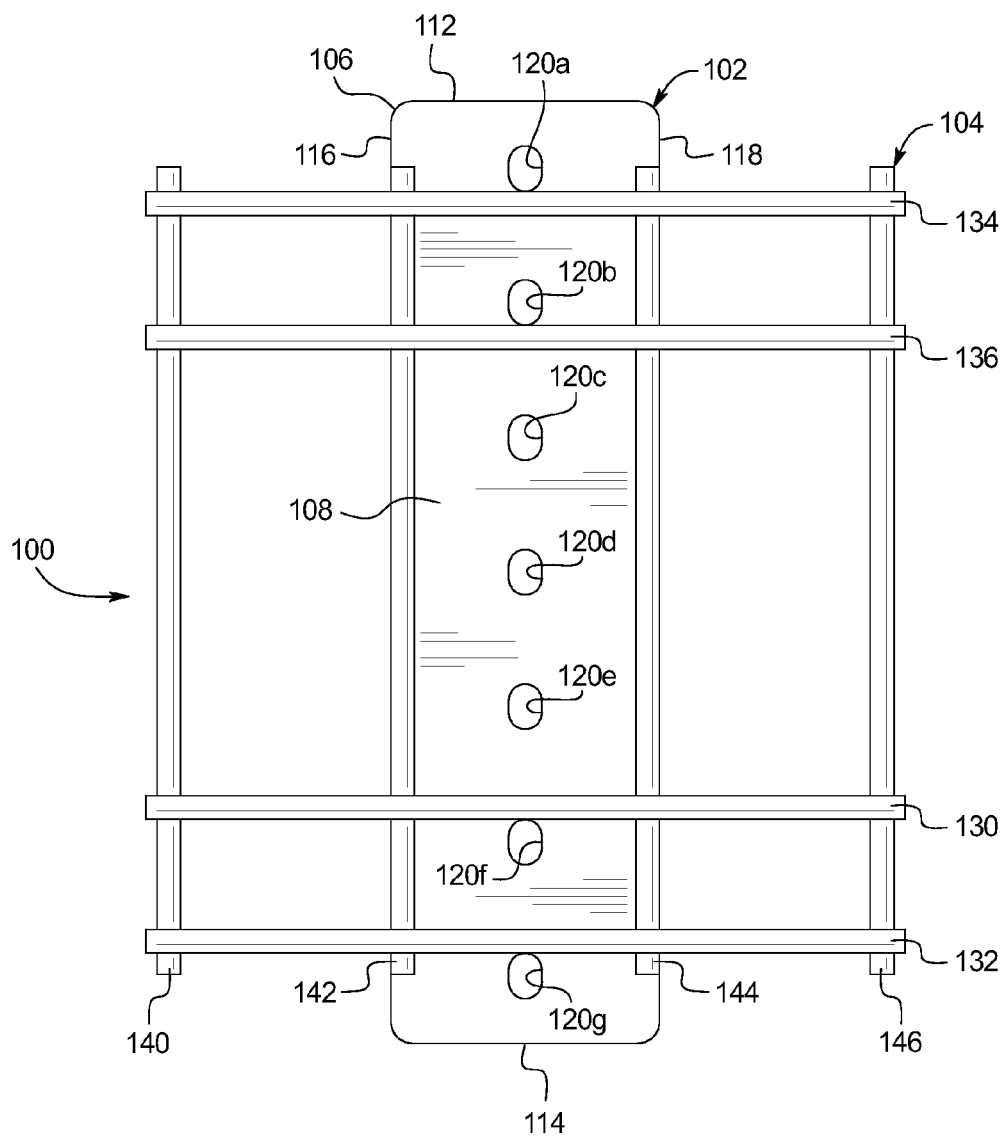
FIG. 4 is a front view of the vehicle wheel chock hanger of FIG. 2.
Figure 5:
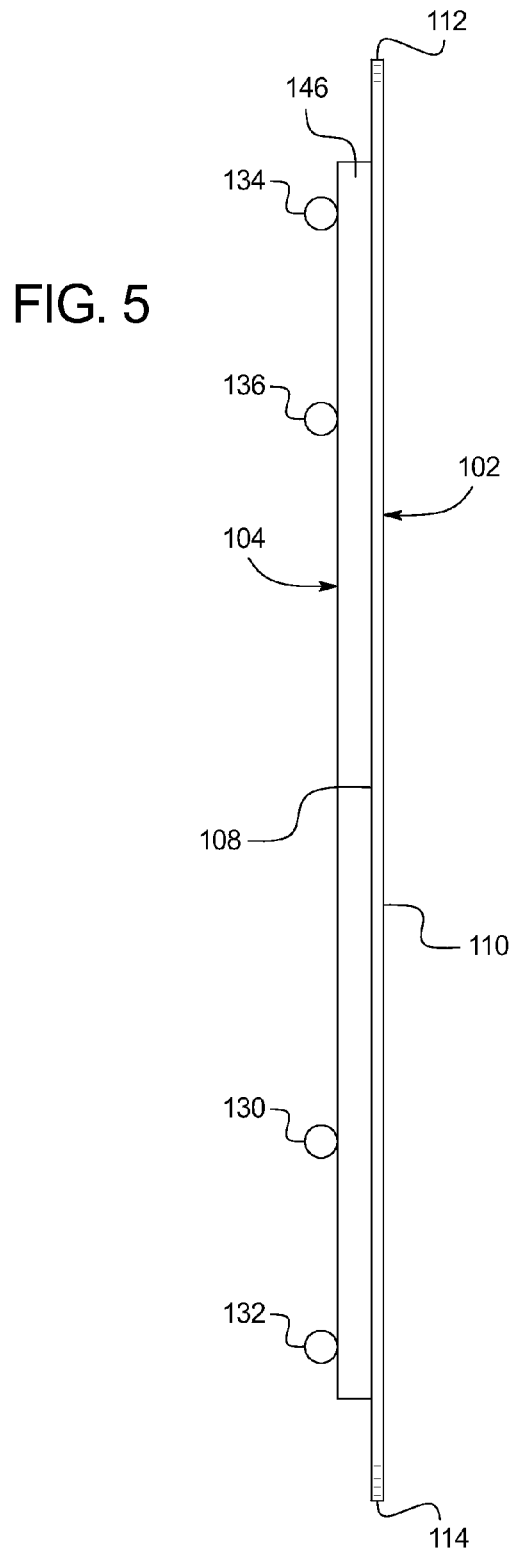
FIG. 5 is a left side view of the vehicle wheel chock hanger of FIG. 2.
Figure 6:
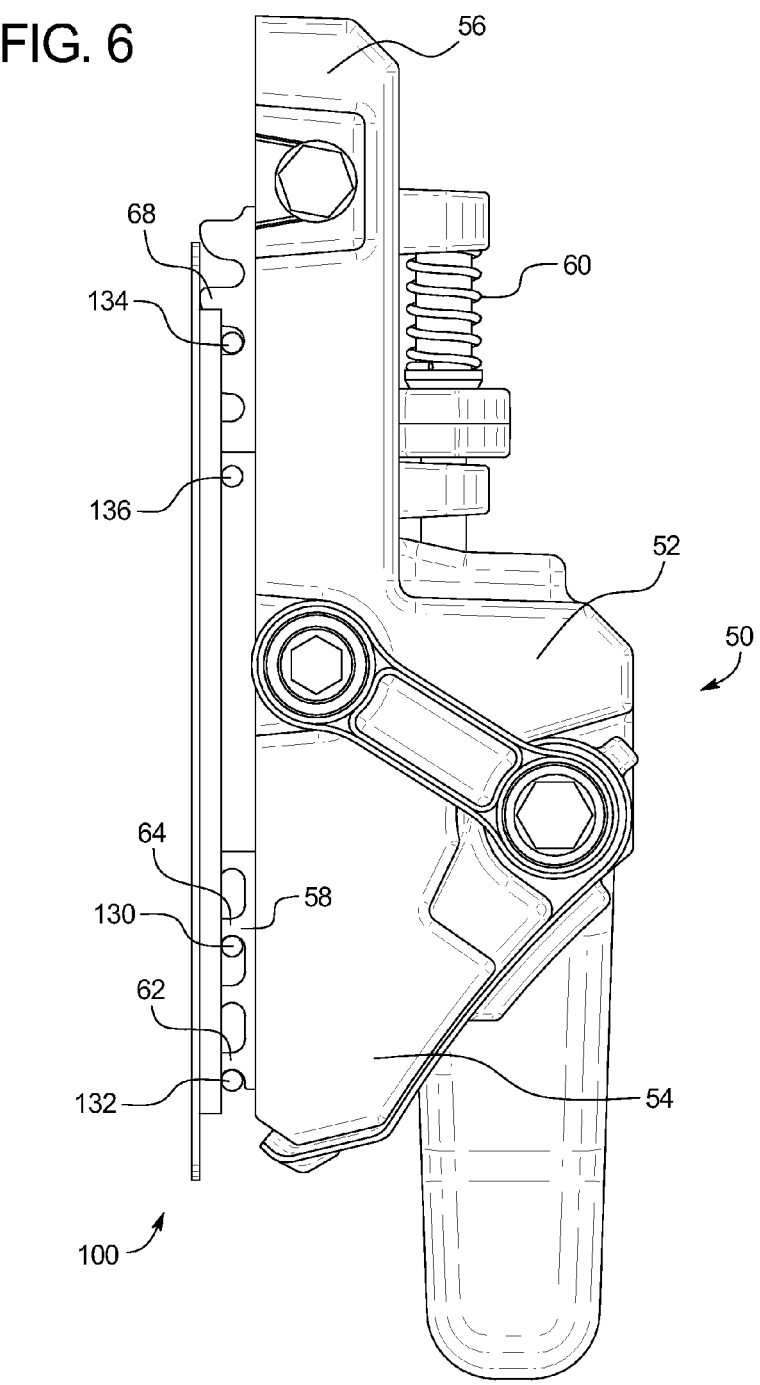
FIG. 6 is a side view of the vehicle wheel chock hanger of FIG. 2 and the vehicle wheel chock of FIG. 2, which illustrates the vehicle wheel chock hanger prior to mounting on a side wall panel of an auto-rack railroad car, and which illustrates the vehicle wheel chock attached to the vehicle wheel chock hanger.
Figure 7:
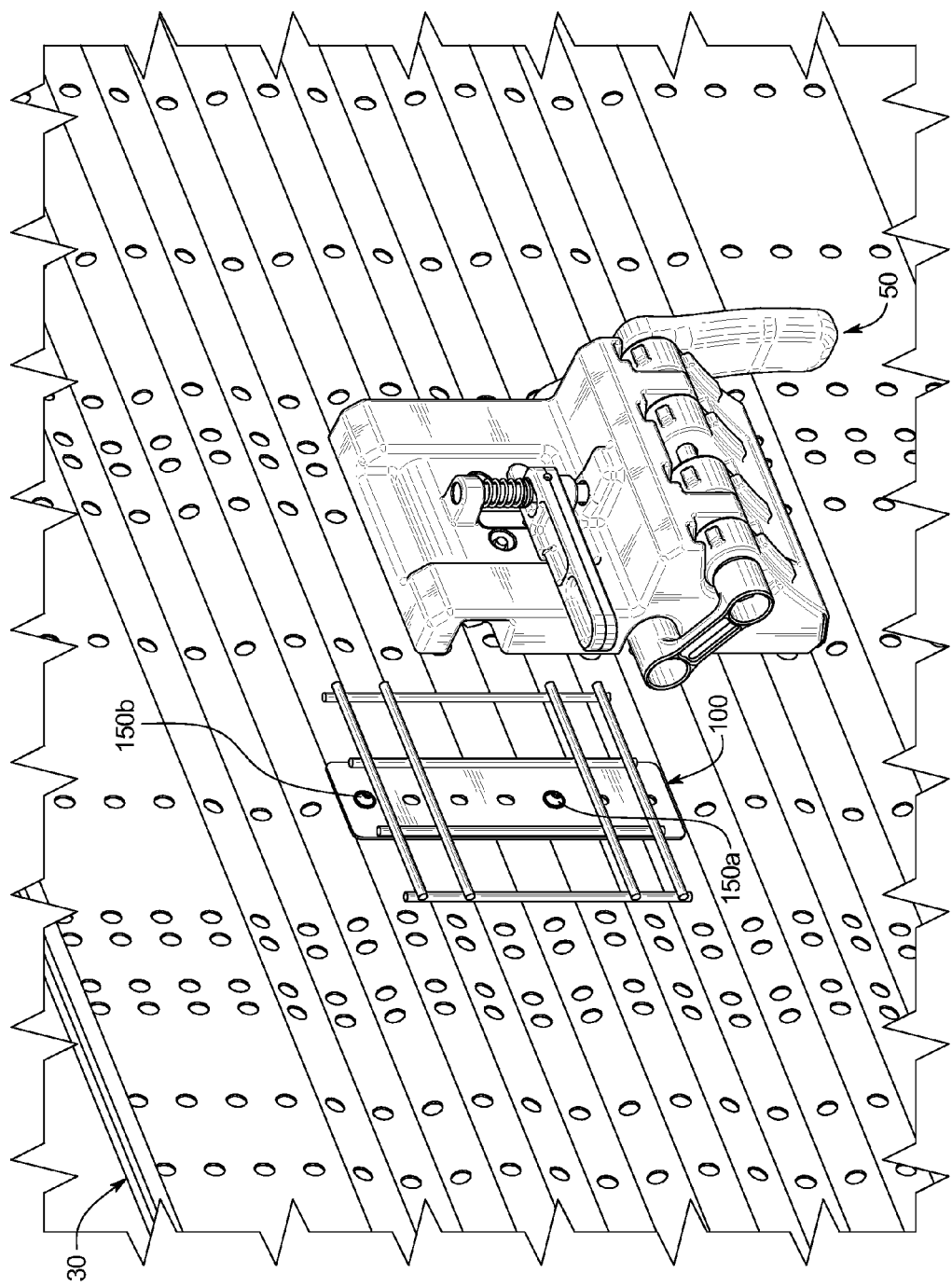
FIG. 7 is a perspective view of the vehicle wheel chock hanger of FIG. 2 and the vehicle wheel chock of FIG. 2, which illustrates the vehicle wheel chock hanger mounted on an inside surface of a side wall panel (shown in fragmentary) of an auto-rack railroad car, and which illustrates the vehicle wheel chock prior to attachment to the vehicle wheel chock hanger.
Figure 8:
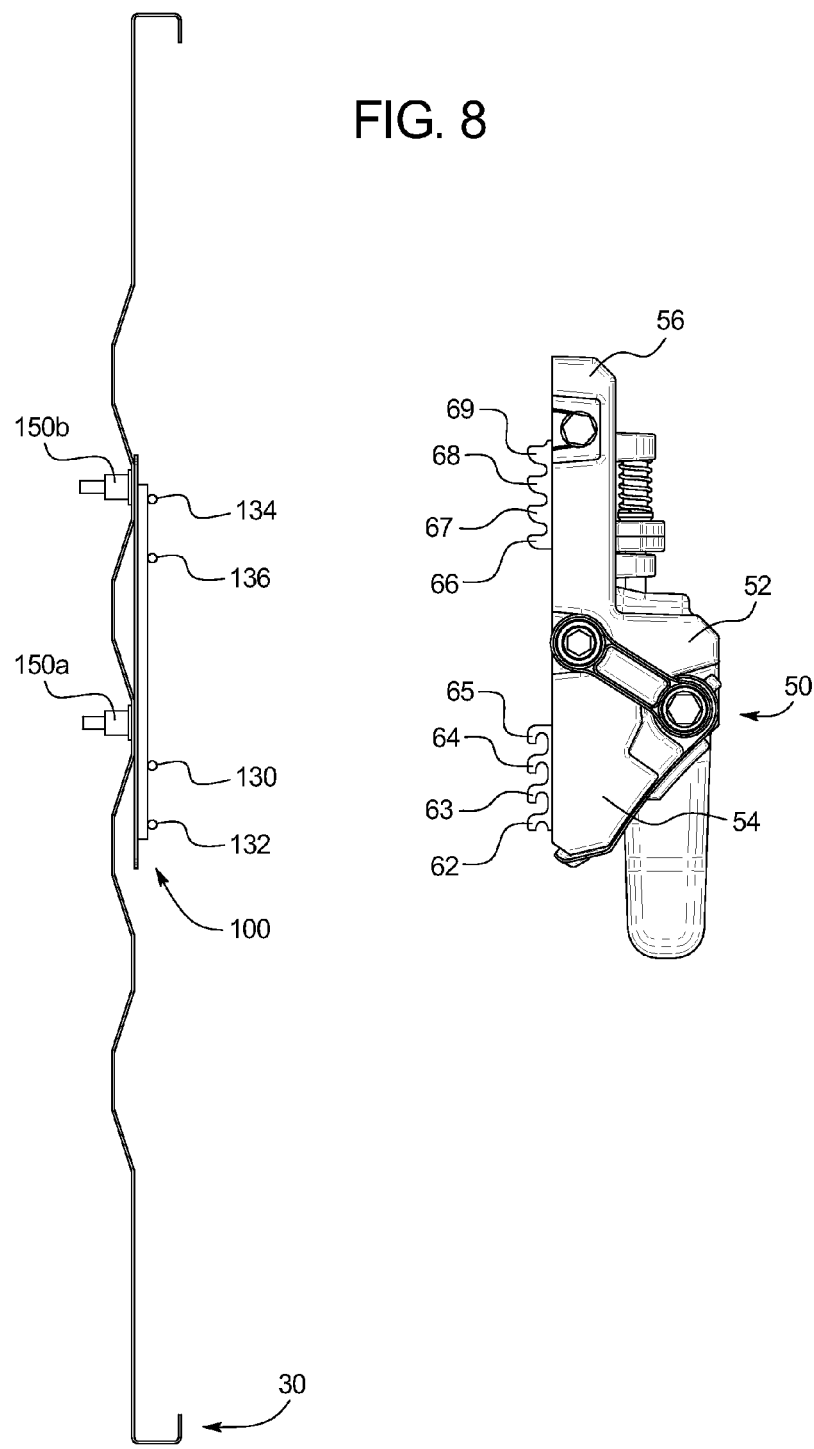
FIG. 8 is a side view of the vehicle wheel chock hanger of FIG. 2 and the vehicle wheel chock of FIG. 2, which illustrates the vehicle wheel chock hanger mounted on an inside surface of a side wall panel of an auto-rack railroad car, and which illustrates the vehicle wheel chock prior to attachment to the vehicle wheel chock hanger.
Figure 9:
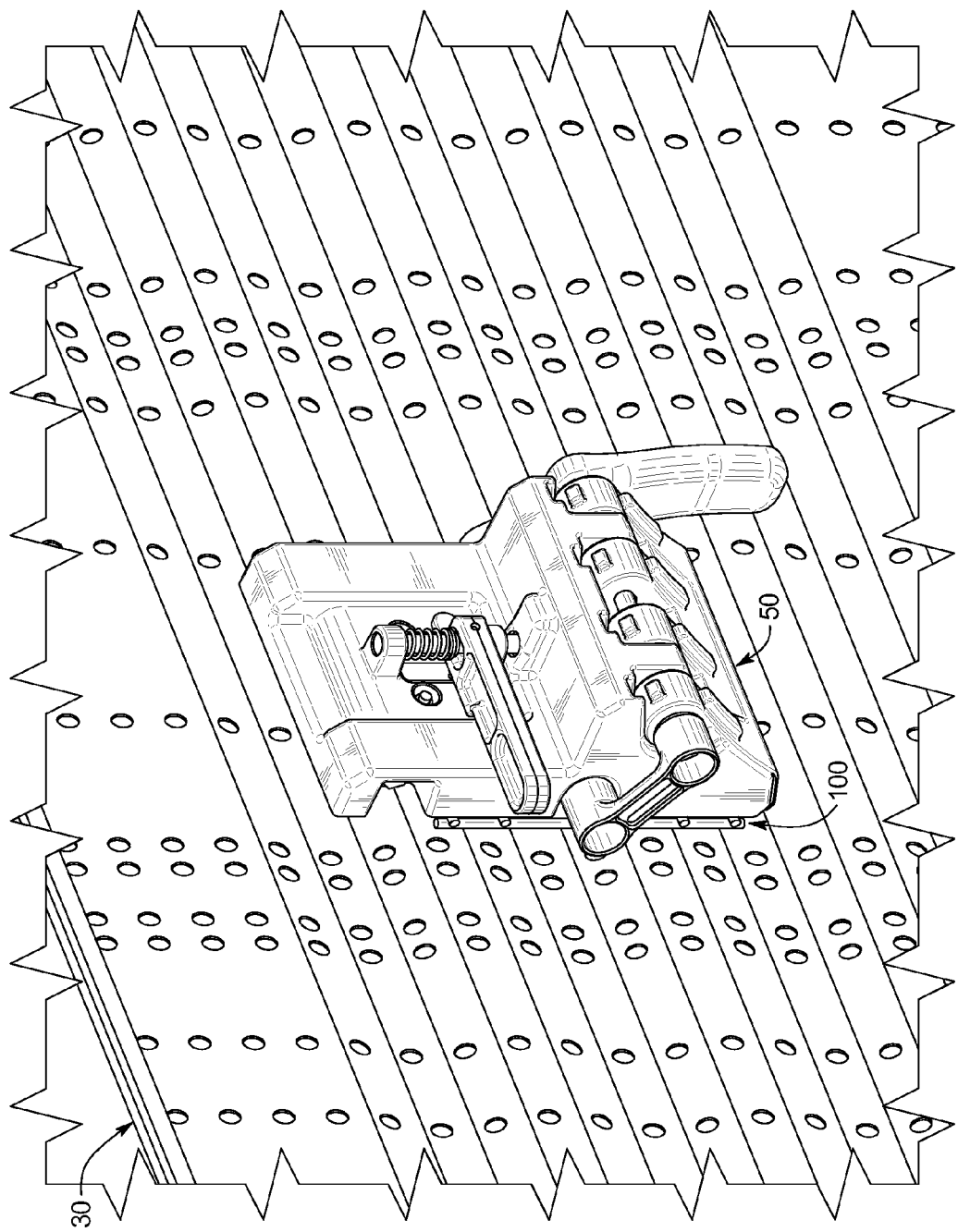
FIG. 9 is a perspective view of the vehicle wheel chock hanger of FIG. 2 and the vehicle wheel chock of FIG. 2, which illustrates the vehicle wheel chock hanger mounted on an inside surface of a side wall panel (shown in fragmentary) of an auto-rack railroad car, and which illustrates the vehicle wheel chock attached to the vehicle wheel chock hanger.
Figure 10:
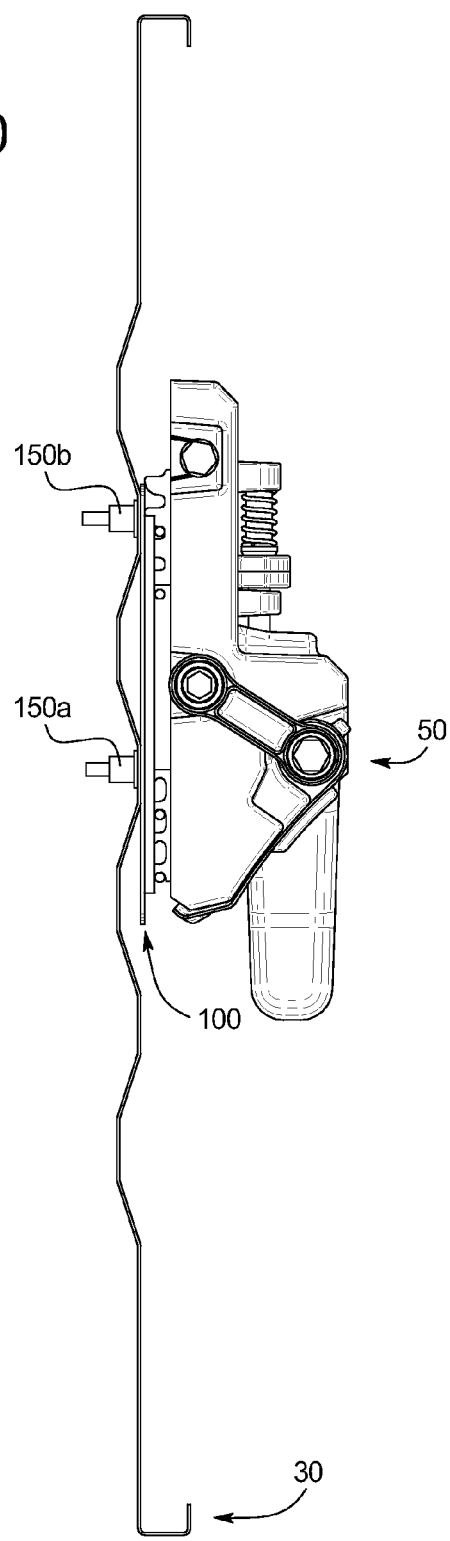
FIG. 10 is a side view of the vehicle wheel chock hanger of FIG. 2 and the vehicle wheel chock of FIG. 2, which illustrates the vehicle wheel chock hanger mounted on an inside surface of a side wall panel of an auto-rack railroad car, and which illustrates the vehicle wheel chock attached to the vehicle wheel chock hanger.

Referring now to the drawings and particularly to FIGS. 1, 7, 8, 9 and 10, a typical auto-rack car 10 includes a frame 12 supported by trucks 14, each of which have several wheels 16 which roll along railroad tracks 18. The frame 12 supports two sidewalls 20 and a roof 22. The auto-rack car 10 includes a pair of co-acting clamshell doors 24 and 26 mounted on each end of the auto-rack car 10. The doors 24 and 26 are opened to facilitate the loading and unloading of vehicles into and out of the auto-rack car 10 and are closed during transport or storage of the vehicles.

The sidewalls 20 include a series of steel vertical posts 28 which are mounted on, and extend upwardly from, the frame 12. The roof 22 is mounted on, and supported by, these vertical posts 28. The vertical posts 28 are evenly spaced along the entire length of both sidewalls 20 of the auto-rack car 10. A plurality of rectangular galvanized steel side wall panels 30 that extend horizontally and are vertically spaced apart are mounted between each pair of vertical posts 28. These side wall panels 30 are supported at their corners by brackets (not shown) that are suitably secured to the vertical posts 28. The average side wall panel 30 has a multiplicity of round sidewall panel holes 23. These side wall panel holes 23 provide the auto-rack car 10 with natural light as well as proper ventilation. Proper ventilation prevents harm from the toxic vehicle fumes to the loaders loading or unloading the vehicles into or out of the auto-rack car 10. These side wall panels 30 are generally corrugated to add strength, and include spaced apart flat or vertically extending surfaces and spaced apart angled extending surfaces.

The auto-rack car 10 may be a tri-level car having first, second and third levels. Normally, eighteen passenger vehicles can be transported in a tri-level auto-rack car, six on each level. The auto-rack car 10 can also have two levels for vehicles instead of three. The bi-level auto-rack car has a lower level and an upper level. The bi-level auto-rack car is generally used to transport larger vehicles, such as vans, mini-vans, pickup trucks, four-by-four and cross-over vehicles. The bi-level auto-rack car can usually transport twelve of these vehicles, six on each level. The auto-rack car may also be a single-level car.

Referring now to FIGS. 2 to 10, one embodiment of the universal vehicle wheel chock hanger, generally indicated by numeral 100, is configured to hold a vehicle wheel restraint or chock such as chock 50 when the vehicle wheel restraint or chock is not in use. It should be appreciated that for purposes of this application, the illustrated chock 50 is one of the embodiments of the Anderson Application; however, the universal vehicle wheel chock hanger of the present disclosure is configured to securely hold multiple different restraints or chocks (at different points in time). The vehicle wheel chock hanger 100, which is sometimes referred to herein as the hanger, includes a mounting base 102 configured to be attached to the sidewall panel of an auto-rack car, and a rack 104 connected to the mounting base 102 and configured to hold multiple different chocks (at different times). The present disclosure contemplates that multiple vehicle wheel chock hangers will be employed in each of the auto-rack cars to respectively hold all of the vehicle wheel restraints or chocks (such as, but not limited to, the Holden Restraints and the Anderson Chocks) when the restraints or chocks are not in use. For example, if four chocks are used to hold each vehicle in an auto-rack car that holds eighteen vehicles, then seventy-two vehicle wheel chock hangers will be employed in that auto-rack car. It should be appreciated that there is a need to minimize the weight of these hangers to save fuel costs. The present disclosure thus contemplates that the vehicle wheel chock hangers are relatively light-weight and easy to install to avoid installation problems, delays, and additional expenses.

More specifically, in this illustrated embodiment, the mounting base 102 includes an elongated substantially flat substantially rectangular body 106 having an interior surface 108, an exterior surface 110, a top edge 112, a bottom edge 114, a right side edge 116, and a left side edge 118. The body 106 defines a plurality of spaced apart attachment holes such as attachment slots 120a, 120b, 120c, 120d, 120e, 120f, and 120g. These attachment slots 120a, 120b, 120c, 120d, 120e, 120f, and 120g are each sized and configured to receive a fastener, such as fastener 150, for attaching the mounting base 102 and the entire universal vehicle wheel chock hanger 100 to the inner surface of a sidewall panel of the auto-rack car. In the illustrated embodiment, each attachment slot is sized and configured to receive a flat head round body blind rivet nut (such as the WELL NUT® fastener sold by Emhart Technologies of Shelton Conn.). The attachments slots are suitably spaced apart to be aligned with the side wall panel holes 23 in the side wall panels of the auto-rack car to facilitate attachment of the mounting base 102 and entire vehicle wheel chock hanger 100 to the side wall panel. The attachment slots are oval to facilitate alignment and to account for the variations in the corrugated side wall panel. It should be appreciated that the size, shape, positions, and number of the attachment slots may vary in accordance with the present disclosure. It should also be appreciated that the fasteners may alternatively be other suitable fasteners. It should also be appreciated that the body 106 can alternatively be formed from multiple sections or parts.

It should be appreciated that unlike the storage pan disclosed in the Holden patents and unlike the currently commercially implemented storage pan that is illustrated in the Anderson Application, the body 106 of the mounting base 102 does not interfere with any of the components of the vehicle restraint or chocks. Specifically, the body 106 of the mounting base 102 is positioned completely behind the rack 104 such that the body 106 of the mounting base 102 cannot interfere with or block any of the top, bottom, or side walls or portions of any vehicle restraint or chock (such as, but not limited to, the Holden Restraints and the Anderson Chocks). It should be appreciated that the mounting base 102 may be otherwise suitably shaped or configured provided that the shape or configuration does not interfere with the attachment of various different vehicle restraints or chocks. In one embodiment, the mounting base 102 is made from galvanized steel. It should be appreciated that the mounting base 102 may be made from stainless steel or any other suitable materials.

The rack 104 generally includes a plurality of front grate engager holders 130 and 132, a plurality of rear grate engager holders 134 and 136, and a plurality of holder supports 140, 142, 144, and 146 connected to the front grate engager holders 130 and 132 and the rear grate engager holders 134 and 136. In this illustrated embodiment, the holder supports 142 and 144 are suitably connected at spaced apart locations to the interior surface 108 of the mounting base 102. In one embodiment, the holder supports 140, 142, 144, and 146 are made from galvanized steel and are attached to the mounting base 102 by welding. It should be appreciated that the holder supports 140, 142, 144, and 146 may be made from stainless steel or any other suitable materials.

The front grate engager holders 130 and 132 and the rear grate engager holders 134 and 136 of the rack 104 are respectively suitably connected at spaced apart locations to the holder supports 142 and 144. In this illustrated embodiment, the front grate engager holders 130 and 132 and the rear grate engager holders 134 and 136 are also respectively suitably connected at spaced apart locations to the holder supports 140 and 146 (which are not directly connected to the mounting base 102). In one embodiment, the front grate engager holders 130 and 132 and the rear grate engager holders 134 and 136 are made from galvanized steel and are attached to the holder supports by welding. This configuration provides support for the front grate engager holders 130 and 132 and the rear grate engager holders 134 and 136 without interfering with these holders. It should be appreciated that the front grate engager holders 130 and 132 and the rear grate engager holders 134 and 136 may be made from stainless steel or any other suitable materials. It should be appreciated that in other embodiments, the attachment mechanism used to attach or connect these components will at least in part depend on the materials that these components are formed from. It should also be appreciated that the front grate engager holders, the rear grate engager holders, and the holder supports may be alternatively shaped, sized, configured and attached provided that: (a) the shape, size, configuration and attachment does not interfere with the attachment of various different vehicle restraints or chocks; and (b) the front grate engager holders and the rear grate engager holders are configured to respectively hold the front grate engagers and the rear grate engagers of the vehicle restraint or chock such as described below. It should also be appreciated that the number of front grate engager holders, the number of rear grate engager holders, and the number of holder supports may be vary in accordance with the present disclosure.

As best seen in FIGS. 2, 3, 6, 7, 8, 9 and 10, the vehicle wheel chock hanger 100 is configured to be aligned with and to hold example chock 50. Chock 50 generally includes a body 52 having a front portion 54 and a rear portion 56, a tire engaging assembly 58 at the front portion of the body 52 for engaging the tire of the vehicle, front grate engagers such as front gate engagers 62, 63, 64, and 65 connected to and extending downwardly and forwardly from the front portion 54 of the body 52, and a locking assembly 60 connected to the central or rear portion 56 of the body 52 to secure the chock 50 to the grating (not shown) and including and rear grate engagers such as rear grate engagers 66, 67, 68, and 69 extending downwardly. These grate engagers are configured to co-act to securely attach the chock 50 to the grating. Although not shown in the drawings, it should be appreciated that as shown in the Holden patents and Anderson Application, the front grate engagers and the rear grate engagers of the vehicle wheel chocks are arranged in multiple rows or groups. That is, although not shown, each front grate engager 62, 63, 64, and 65 is part of, and aligned with, a row of front grate engagers, and each rear grate engager 66, 67, 68, and 69 is part of, and aligned with, a row of rear grate engagers.

The vehicle wheel chock hanger 100 is configured to be mounted or attached to the inner surface of the side wall panel of an auto-rack car as generally illustrated in FIGS. 7 to 10. These figures show that multiple fasteners 150a and 150b are employed to attach the mounting base 106 of the vehicle wheel chock hanger 100 to the side wall panel of the auto-rack car. These figures also show that the attachment holes facilitate alignment with the holes in the flat or vertically extending portions of the side wall panel.

These figures (in addition to FIGS. 2 and 3) generally show the alignment and positioning of the chock 50 relative to the vehicle wheel chock hanger 100 before the chock 50 is mounted on or attached to the vehicle wheel chock hanger 100 for storage and when the chock 50 is mounted on or attached to the vehicle wheel chock hanger 100 for storage. When mounted or attached to the vehicle wheel chock hanger 100, in the illustrated position, (a) the front grate engagers 62 and 64 are respectively hooked on the front grate engager holders 130 and 132, and (b) one or more of the rear grate engagers 66 and 68 rest on the rear grate engager holders 134 and 136. It should be appreciated that: (a) not all of the front grate engagers need to engage front grate engager holders 130 and 132 for the chock to be securely held; (b) not all of the rear grate engagers need to engage the rear grate engager holders 134 and 136 for the chock to be securely held; (c) additional front grate engagers, which are not illustrated but that are in the same rows as front grate engagers 62 and 64, would be hooked on the front grate engager holders 130 and 132 when the chock 50 is in this mounted position; (d) additional rear grate engagers, which are not illustrated but that are in the same rows as rear grate engagers 66 and 68, would be hooked on the rear grate engager holders 134 and 136 when the chock 50 is in this mounted position; and (e) by providing multiple front grate engager holders and multiple rear grate engager holders, vehicle restraints or chocks of different sizes and shapes may be attached to and held by the vehicle wheel chock hangers 100 of the present disclosure when such restraints or chocks are not in use.

In alternative embodiments, instead of replacing the existing chock storage pans that are currently employed in auto-rack railroad cars, the present disclosure provides a vehicle wheel chock hanger that is configured to be mounted in the existing chock storage pan and to co-act with the existing chock storage pan to hold or store multiple different vehicle restraints or chocks (such as, but not limited to, the Holden Restraints and the Anderson Chocks).

Figure 11:
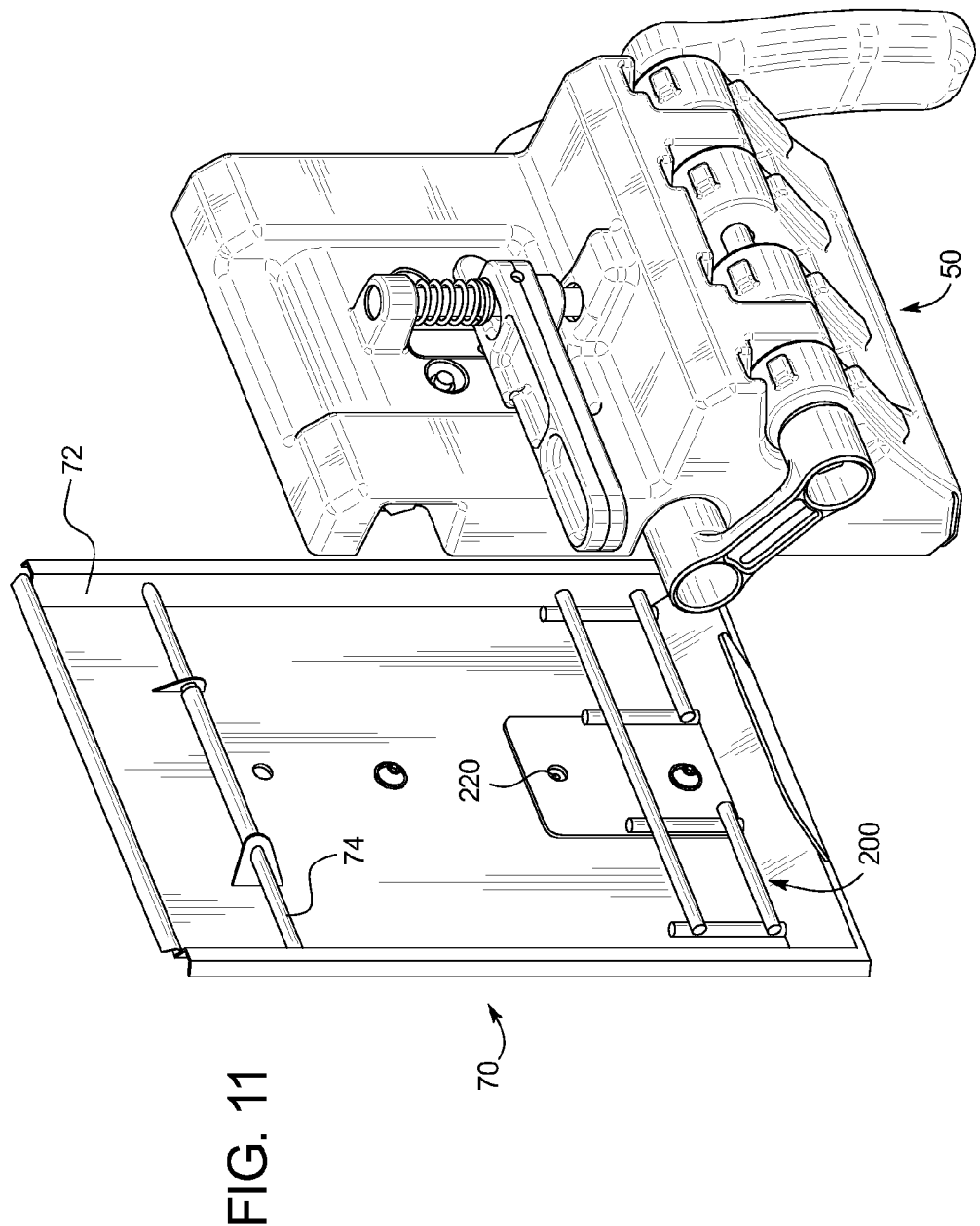
FIG. 11 is a perspective view of another embodiment of the vehicle wheel chock hanger of the present disclosure which is mounted in a storage pan, and a vehicle wheel chock configured to be attached to the vehicle wheel chock hanger and the storage pan, which illustrates the vehicle wheel chock hanger and the storage pan prior to mounting on a side wall panel of an auto-rack railroad car, and which illustrates the vehicle wheel chock prior to attachment to the vehicle wheel chock hanger and the storage pan.
Figure 12:
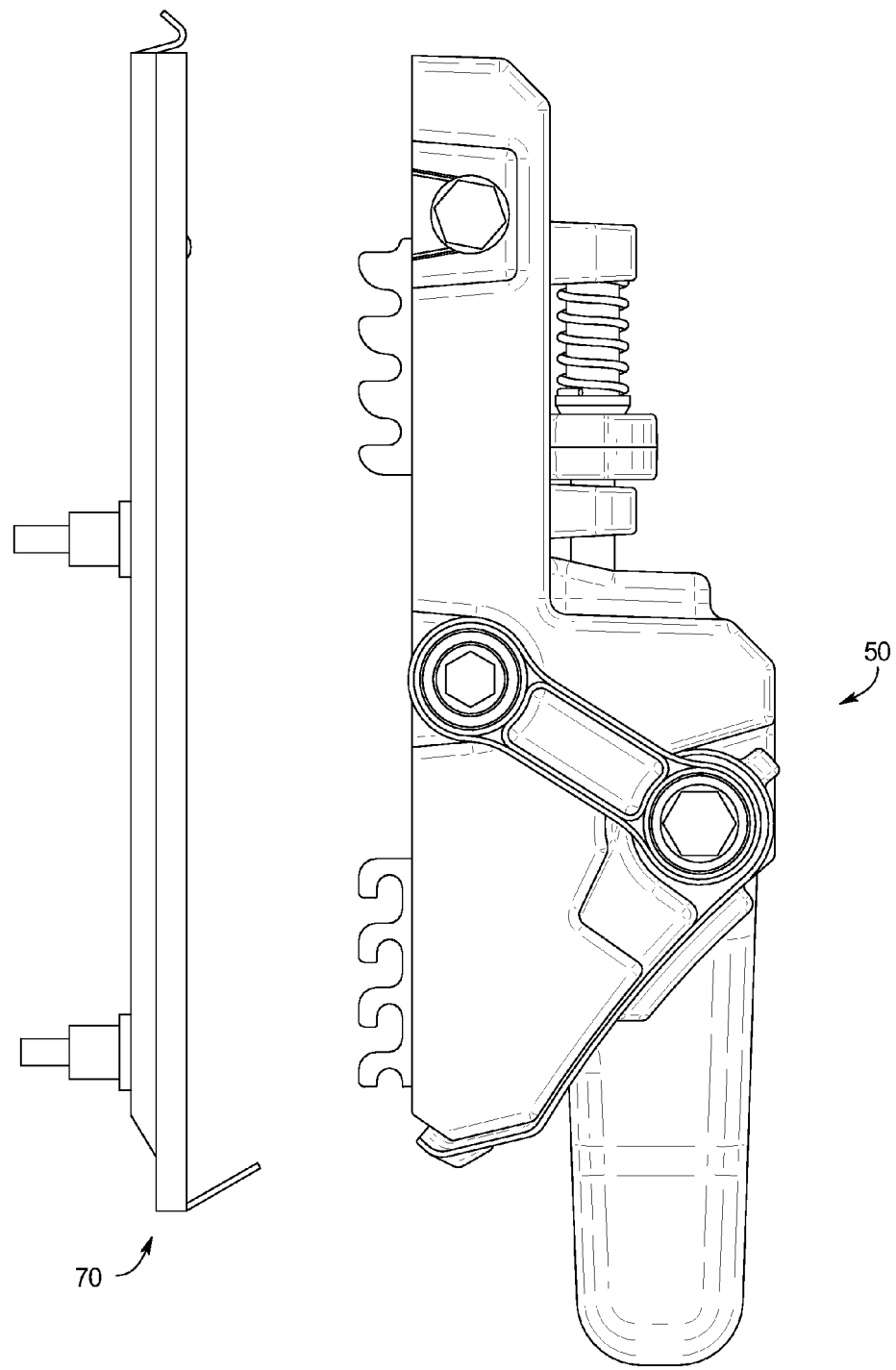
FIG. 12 is a side view of the vehicle wheel chock hanger of FIG. 11 mounted in the storage pan of FIG. 11 and the vehicle wheel chock of FIG. 11, which illustrates the vehicle wheel chock hanger and the storage pan prior to mounting on a side wall panel of an auto-rack railroad car, and which illustrates the vehicle wheel chock prior to attachment to the vehicle wheel chock hanger and the storage pan.
Figure 13:
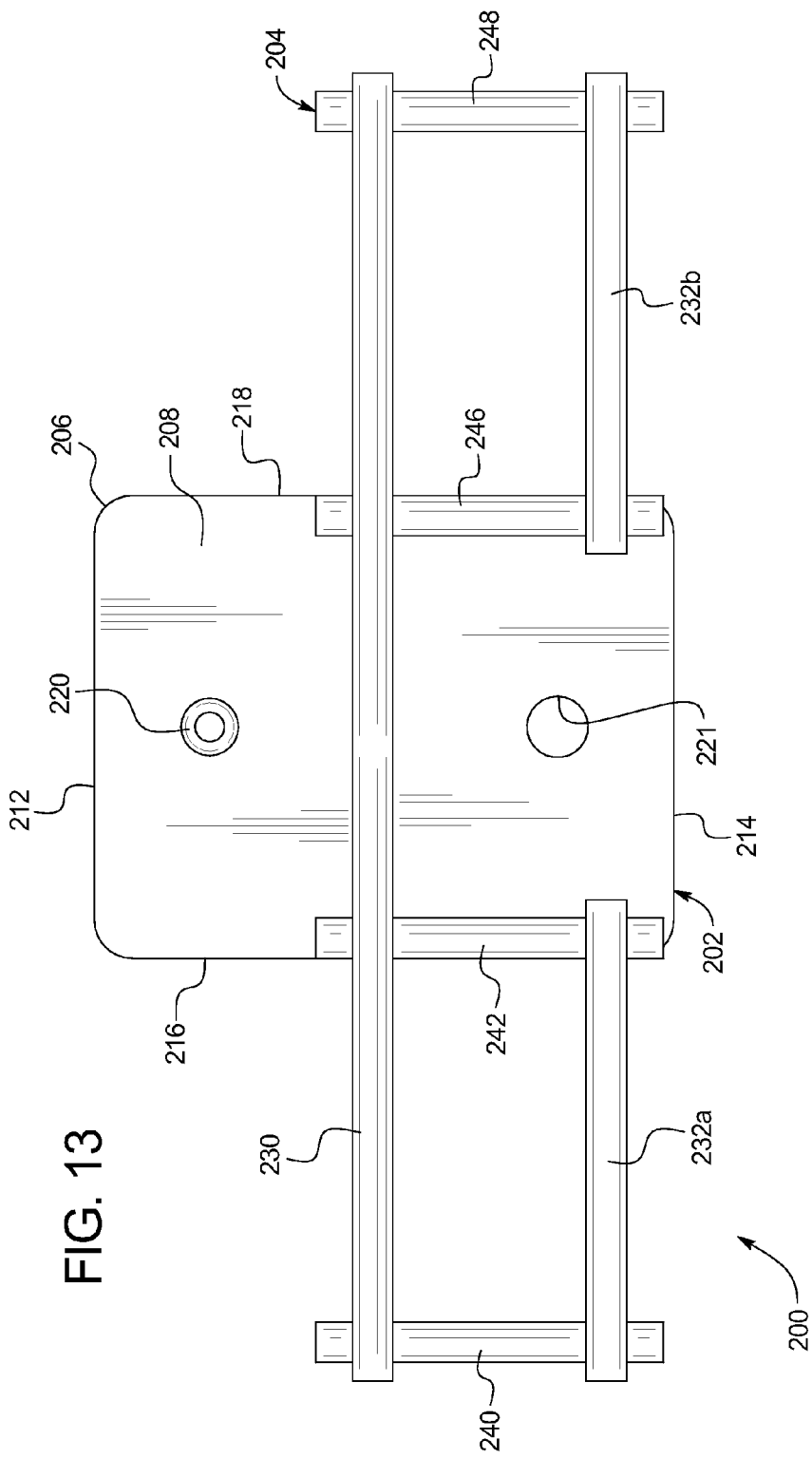
FIG. 13 is a front view of the vehicle wheel chock hanger of FIG. 11.
Figure 14:
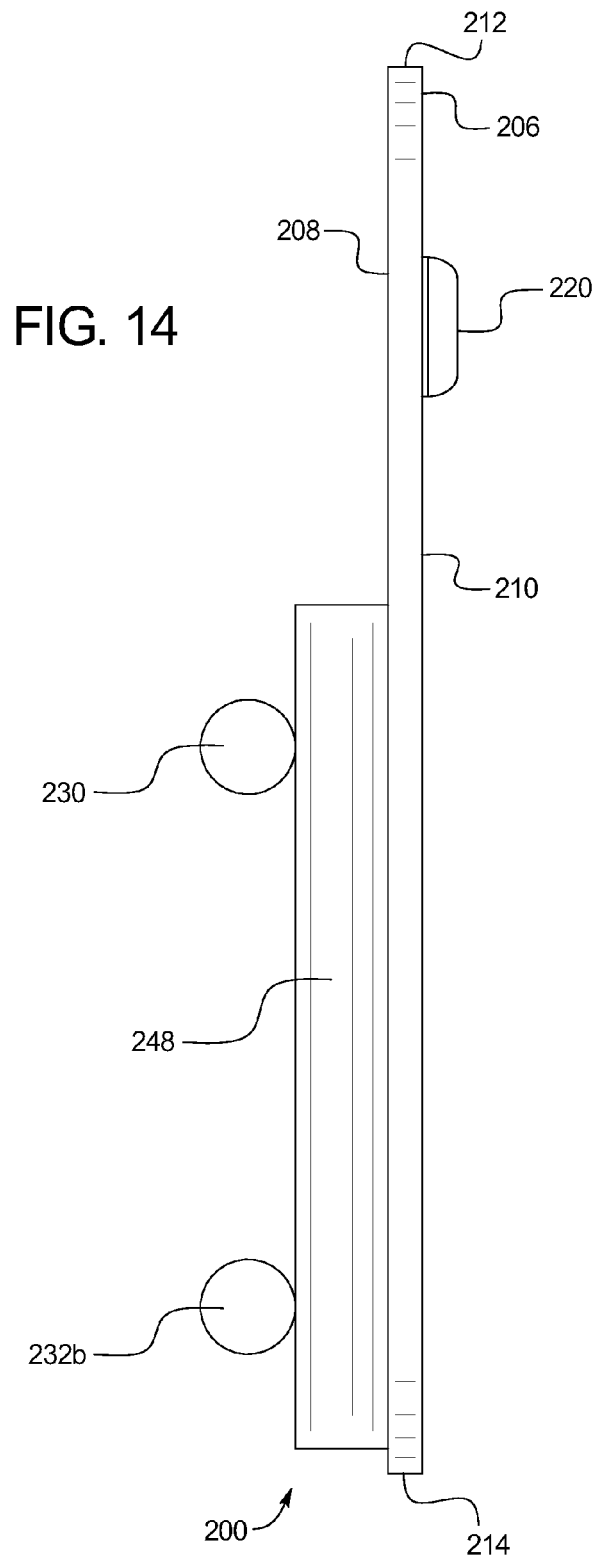
FIG. 14 is a left side view of the vehicle wheel chock hanger of FIG. 11.
Figure 15:
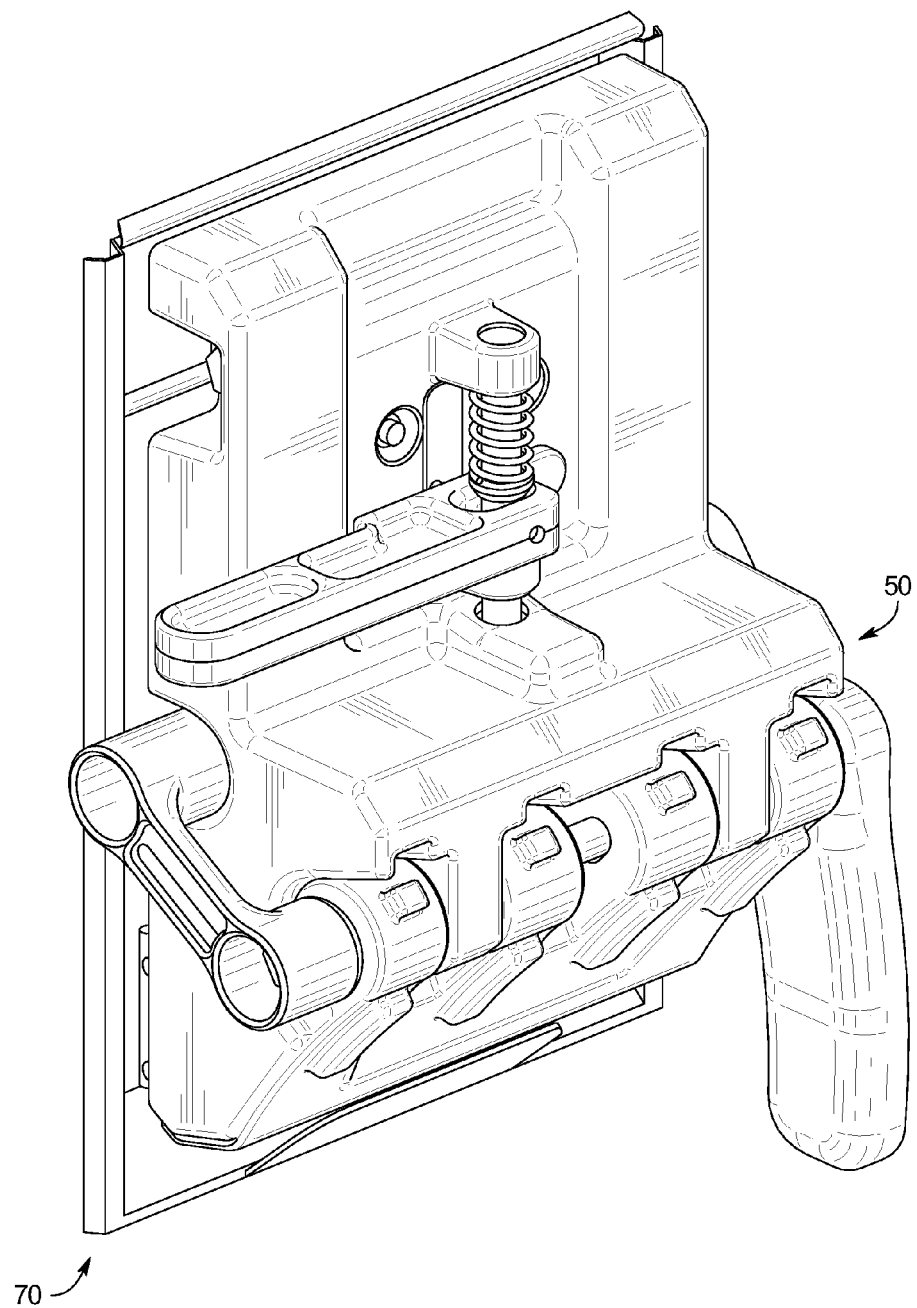
FIG. 15 is a perspective view of the vehicle wheel chock hanger of FIG. 11 mounted in the storage pan of FIG. 11 and the vehicle wheel chock of FIG. 11, which illustrates the vehicle wheel chock hanger and the storage pan prior to mounting on a side wall panel of an auto-rack railroad car, and which illustrates the vehicle wheel chock attached to the vehicle wheel chock hanger and the storage pan.
Figure 16:
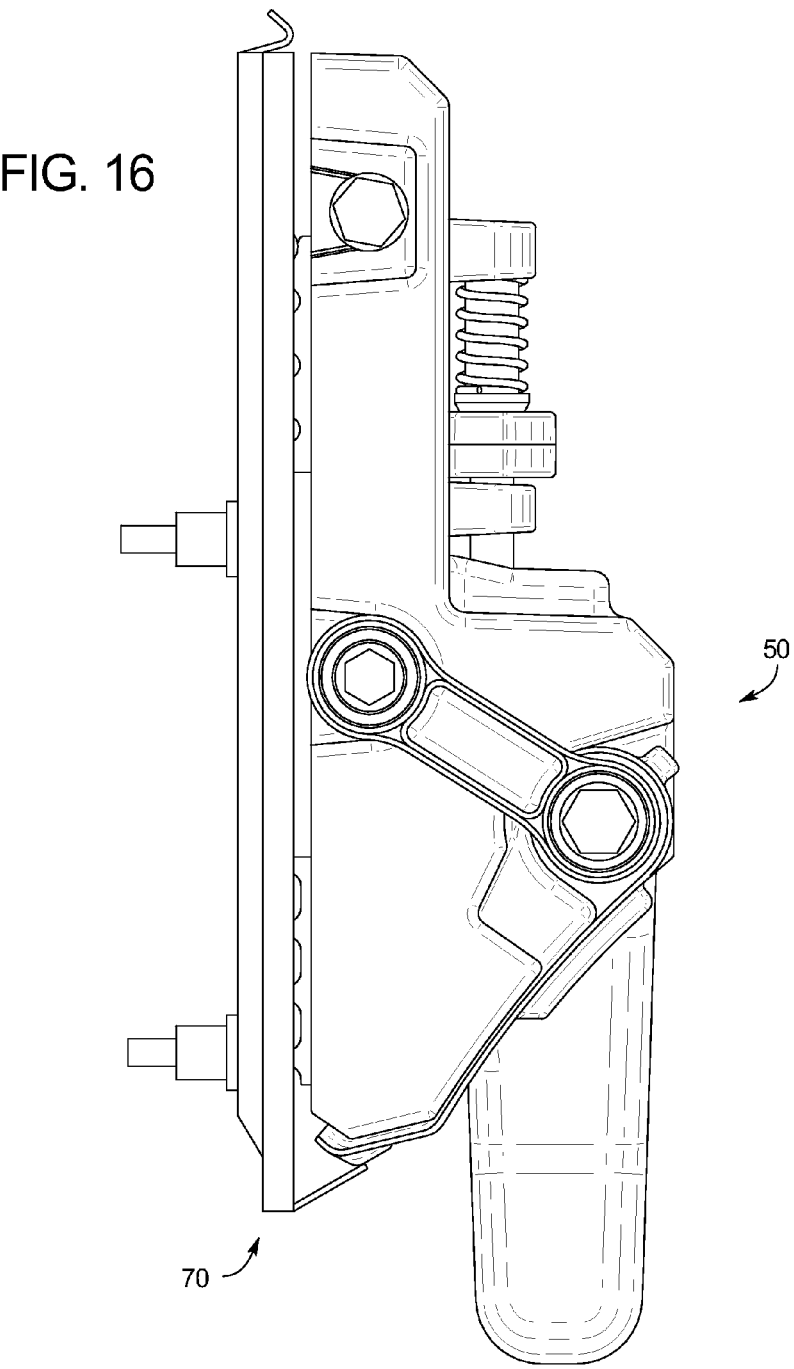
FIG. 16 is a side view of the vehicle wheel chock hanger of FIG. 11 mounted in the storage pan of FIG. 11 and the vehicle wheel chock of FIG. 11, which illustrates the vehicle wheel chock hanger and the storage pan prior to mounting on a side wall panel of an auto-rack railroad car, and which illustrates the vehicle wheel chock attached to the vehicle wheel chock hanger and the storage pan.
Figure 17:
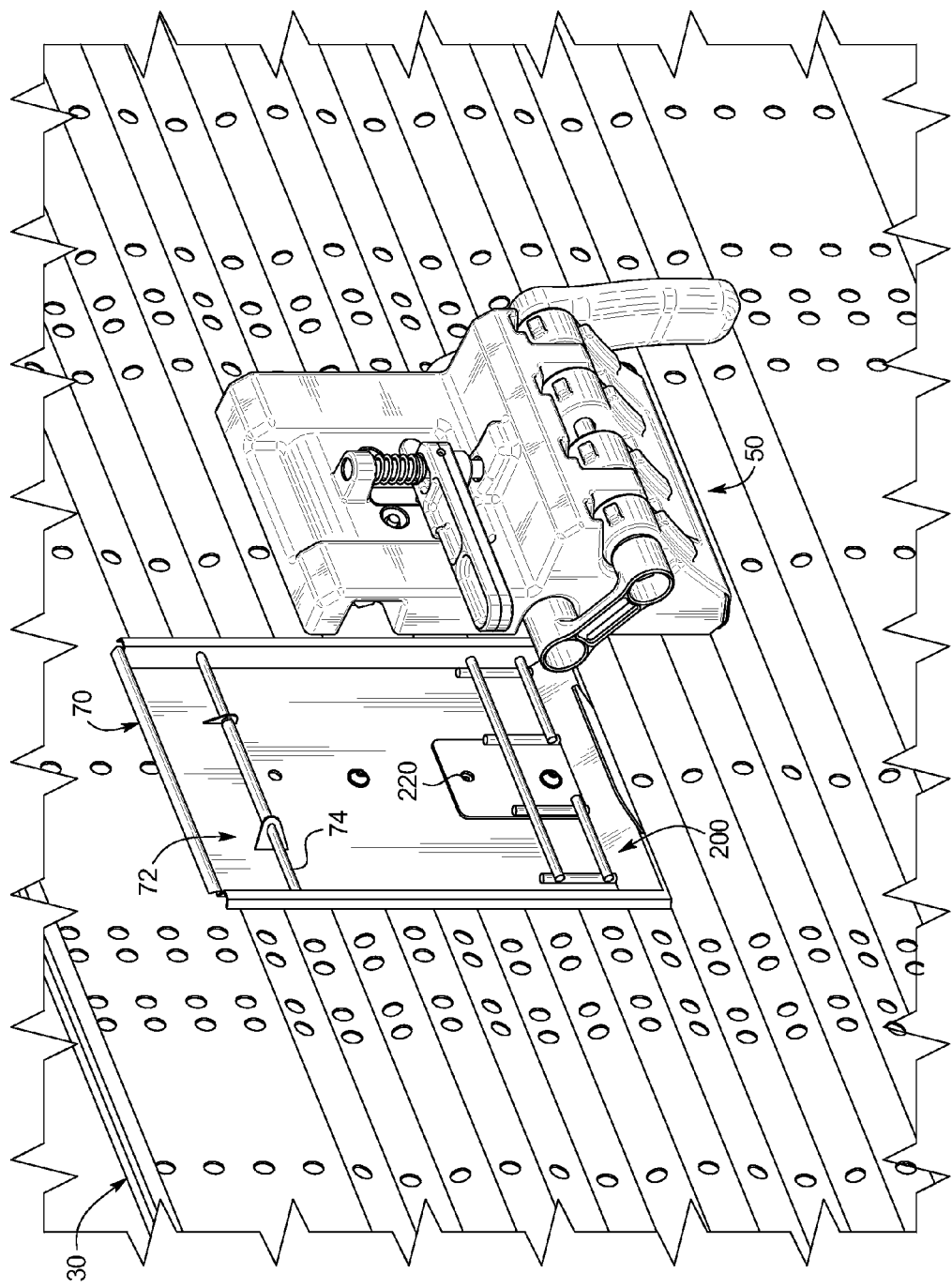
FIG. 17 is a perspective view of the vehicle wheel chock hanger of FIG. 11 mounted in the storage pan of FIG. 11 and the vehicle wheel chock of FIG. 11, which illustrates the vehicle wheel chock hanger and the storage pan mounted on an inner surface of a side wall panel of an auto-rack railroad car, and which illustrates the vehicle wheel chock prior to attachment to the vehicle wheel chock hanger and the storage pan.
Figure 18:
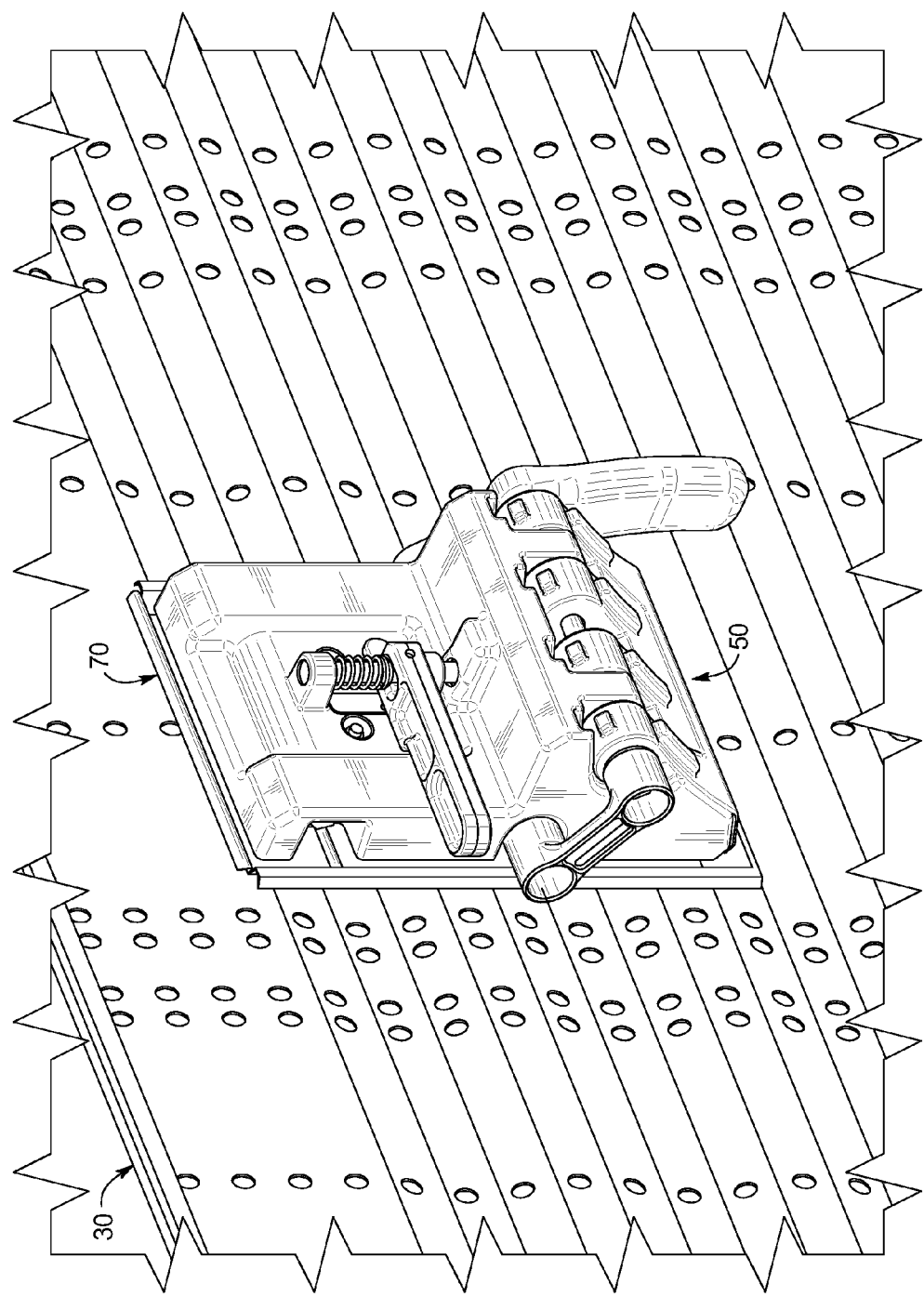
FIG. 18 is a perspective view of the vehicle wheel chock hanger of FIG. 11 mounted in the storage pan of FIG. 11 and the vehicle wheel chock of FIG. 11, which illustrates the vehicle wheel chock hanger and the storage pan mounted on an inner surface of a side wall panel of an auto-rack railroad car, and which illustrates the vehicle wheel chock attached to the vehicle wheel chock hanger and the storage pan.

One example of such a vehicle wheel chock hanger is generally illustrated in FIGS. 11 to 18. In this embodiment, the vehicle wheel chock hanger of the present disclosure, generally indicated by numeral 200, is configured to co-act with a storage pan, generally indicated by numeral 70, to hold a vehicle wheel chock such as chock 50 when the chock is not in use. The storage pan 70 includes a pan 72 and a cross bar 74 connected to the pan 72 and extending across an upper portion of the pan 72. While this pan 72 is configured to hold the Holden Restraint, this pan 72 is not suitably configured to hold the Anderson Chock (in part because the expected commercial implementation of the Anderson Chock does not include hooks in the rear portion of the Anderson Chock and in part because of the bottom lip of the nose of the storage pan). The vehicle wheel chock hanger 200 is configured to be mounted in the lower portion of the pan 72 as best seen in FIGS. 11 and 17.

More specifically, in this illustrated embodiment, the mounting base 202 includes an somewhat shorter substantially flat substantially rectangular body 206 having an interior surface 208, an exterior surface 210, a top edge 212, a bottom edge 214, a right side edge 216, and a left side edge 218. The body 206 defines an attachment hole, such as an attachment slot 221, and a dimple 220 configured to facilitate attachment to the storage pan 70 and the side wall panel 30. The dimple 220 is configured to extend into an attachment hole (not shown) in the storage pan 70 for alignment of the wheel chock hanger 200 in the storage pan 70. The attachment slot 221 is sized and configured to receive a fastener for attaching the mounting base 202 and the entire universal vehicle wheel chock hanger 200 to the storage pan 70 and the side wall panel of an auto-rack car. In the illustrated embodiment, the attachment slot 221 is sized and configured to receive a flat head round body blind rivet nut (such as the WELL NUT® fastener sold by Emhart Technologies of Shelton Conn.). The attachment slot 221 is suitably spaced apart from the dimple 220 to be respectively aligned with the attachment holes in the storage pan 70 and side wall panel holes 23 in the side wall panel of the auto-rack car to facilitate attachment of the mounting base 202 and entire vehicle wheel chock hanger 100 to the storage pan 70 and the side wall panel. It should be appreciated that the size, shape, positions, and number of the attachments slots may vary in accordance with the present disclosure. It should also be appreciated that the size, shape, position, and number of dimples may vary in accordance with the present disclosure. It should further be appreciated that this embodiment of the wheel chock hanger can alternatively be attached only to the storage pan 70, which is in turn attached the to side wall panel.

The body 206 does not interfere with any of the components of the restraint or chocks. Specifically, the mounting base 202 is positioned completely behind the rack 204 and in the pan 72. It should be appreciated that the mounting base 202 may be otherwise suitably shaped or configured, provided that the shape or configuration does not interfere with the attachment of various different vehicle restraints or chocks. In one embodiment, the mounting base 202 is made from galvanized steel. It should be appreciated that the mounting base 202 may be made from stainless steel or any other suitable materials.

The rack 204 generally includes a plurality of front grate engager holders 230, 232a, and 232b, and a plurality of holder supports 240, 242, 246, and 248 connected to the front grate engager holders 230, 232a, and 232b. In this illustrated embodiment, the holder supports 242 and 246 are suitably connected at spaced apart locations to the interior surface 208 of the mounting base 202. In one embodiment, the holder supports 242 and 246 are made from galvanized steel and are attached to the mounting base 202 by welding. It should be appreciated that the holder supports 242 and 246 may be made from stainless steel or any other suitable materials. The front grate engager holder 230 is connected at spaced apart locations to the holder supports 240, 242, 246, and 248. The front grate engager holder 232a is connected at spaced apart locations to the holder supports 240 and 242. The front grate engager holder 232b is connected at spaced apart locations to the holder supports 246 and 248. In this embodiment, the front grate engager holders 230, 232a, and 232b are made from galvanized steel, and are attached to the holder supports 246 and 248 by welding. This configuration provides support for the front grate engager holders 230, 232a, and 232b without interfering with these holders. It should be appreciated that the front grate engager holders 230, 232a, and 232b may be made from stainless steel or any other suitable materials. It should also be appreciated that in other embodiments, the attachment mechanism used to attach these components will at least in part depend on the materials that these components are formed from. It should further be appreciated that the front grate engager holders 230, 232a, and 232b and the holder supports 242 and 246 may be alternatively shaped, sized, configured, and attached, provided that: (a) the shape, size, configuration, and attachment does not interfere with the attachment of various different vehicle restraints or chocks; and (b) the front grate engager holders respectively hold the front grate engagers of the vehicle restraint or chock such as described below. It should also be appreciated that the number of front grate engager holders and the number of holder supports may vary in accordance with the present disclosure.

As mentioned above, the vehicle wheel chock hanger 200 is configured to be mounted or attached to the inner surface of the storage pan 70, which is configured to be attached to the side wall panel of an auto-rack car as generally illustrated in FIGS. 11, 15, 16, 17, and 18. These figures show that at least one fastener is employed to attach the mounting base 202 of the vehicle wheel chock hanger 200 to the side wall panel of the auto-rack car. These figures also show that at least one fastener is used to attach the pan 72 to the side wall panel. These figures generally show the alignment and positioning of the chock 50 relative to the storage pan 70 and the vehicle wheel chock hanger 200 before the chock 50 is mounted on or attached to the storage pan 70 and the vehicle wheel chock hanger 200 for storage and when the chock 50 is mounted on or attached to the storage pan 70 and the vehicle wheel chock hanger 200 for storage. When mounted or attached to the storage pan 70 and the vehicle wheel chock hanger 200, in one position: (a) the front grate engagers 62 and 64 are respectively hooked on the front grate engager holders 230, 232a, and 232b; and (b) one of the rear grate engagers 66, 67, 68, and 69 rest on the cross bar 74 of the storage pan 70. It should be appreciated that: (a) not all of the front grate engagers need to engage front grate engager holders 230, 232a, and 232b; (b) not all of the rear grate engagers 66 and 68 need to engage the cross bar 74; and (c) additional front grate engagers, which are not illustrated but which are in the same rows as front grate engagers 62 and 64, would be hooked on the front grate engager holders 230, 232a, and 232b when the chock is in this mounted position; (d) additional rear grate engagers, which are not illustrated but which are in the same rows as rear grate engagers 66 and 68, would be hooked on the cross bar 74 when the chock is in this mounted position; and (e) by providing multiple front grate engager holders that are configured to co-act with the crossbar, vehicle restraints or chocks of different sizes and shapes may be attached to, and held by, the combination vehicle wheel chock hanger and storage pan of the present disclosure when such restraints or chocks are not in use.

Figure 19:
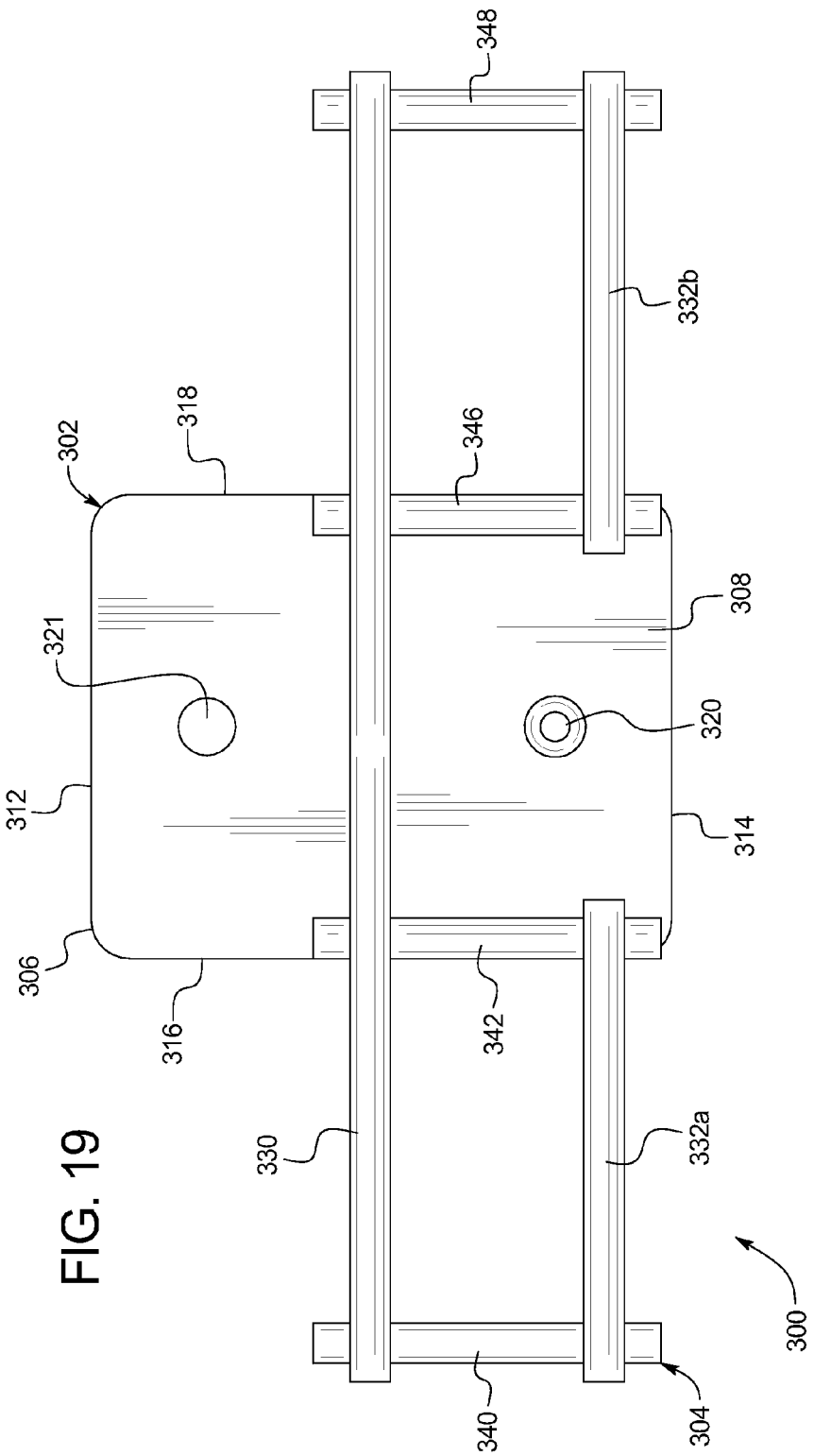
FIG. 19 is a front view of an alternative embodiment of the vehicle wheel chock hanger of the present disclosure.
Figure 20:
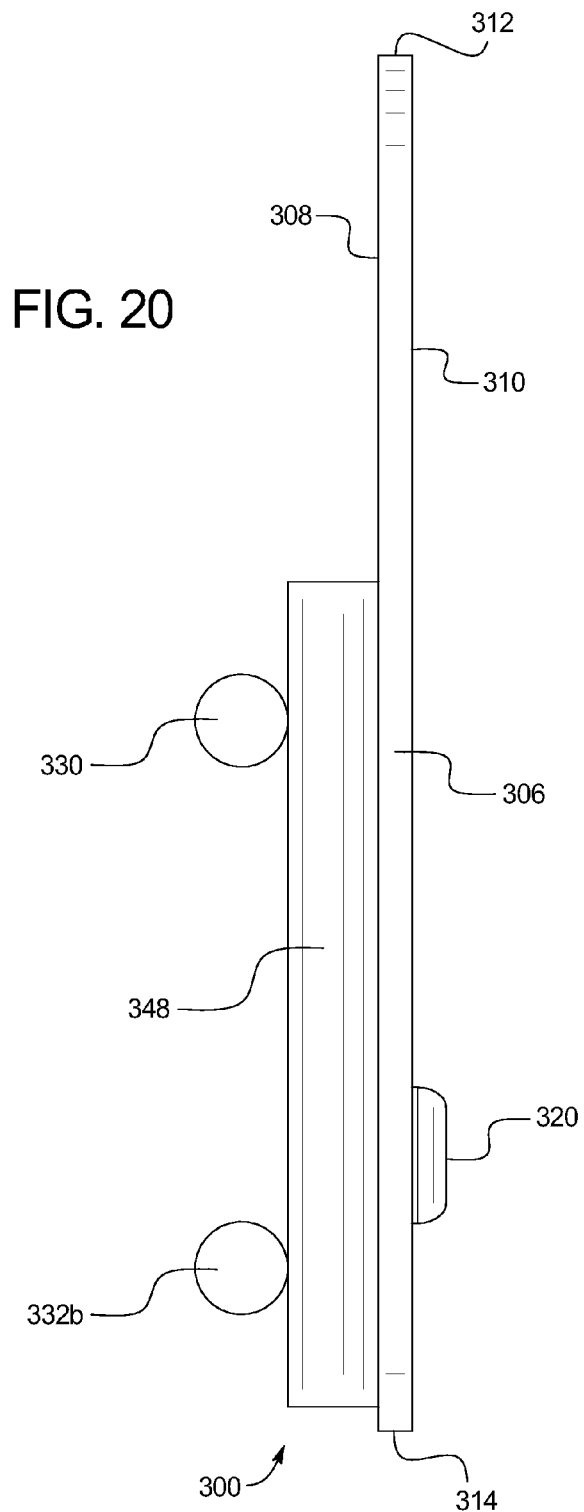
FIG. 20 is a left side view of the vehicle wheel chock hanger of FIG. 19.

Turning now to FIGS. 19 and 20, another embodiment of the vehicle wheel chock hanger, generally indicated by numeral 300, is configured to co-act with a storage pan 70 to hold the vehicle wheel chock, such as chock 50, when the chock is not in use. This vehicle wheel chock hanger 300 is similar to vehicle wheel chock hanger 200 except for the placement of the dimple 320 and the attachment slot 321. More specifically, vehicle wheel chock hanger 300 includes a mounting base 302 having a substantially flat substantially rectangular body 306 having an interior surface 308, an exterior surface 310, a top edge 312, a bottom edge 314, a right side edge 316, and a left side edge 318. The body 306 defines an attachment hole, such as attachment slot 321, and a dimple 320 configured to facilitate attachment to the storage pan 70 and the side wall panel. The positions of the dimple 320 and the attachment slot 321 are switched from vehicle wheel chock hanger 200. The rack 304 generally includes a plurality of front grate engager holders 330, 332a, and 332b and a plurality of holder supports 340, 342, 346, and 348 connected to the front grate engager holders 330, 332a, and 332b. In this illustrated embodiment, the holder supports 342 and 346 are suitably connected at spaced apart locations to the interior surface 308 of the mounting base 302. The front grate engager holder 330 is connected at spaced apart locations to the holder supports 340, 342, 346, and 348. The front grate engager holder 332a is connected at spaced apart locations to the holder supports 340 and 342. The front grate engager holder 332b is connected at spaced apart locations to the holder supports 346 and 348.

Figure 21:
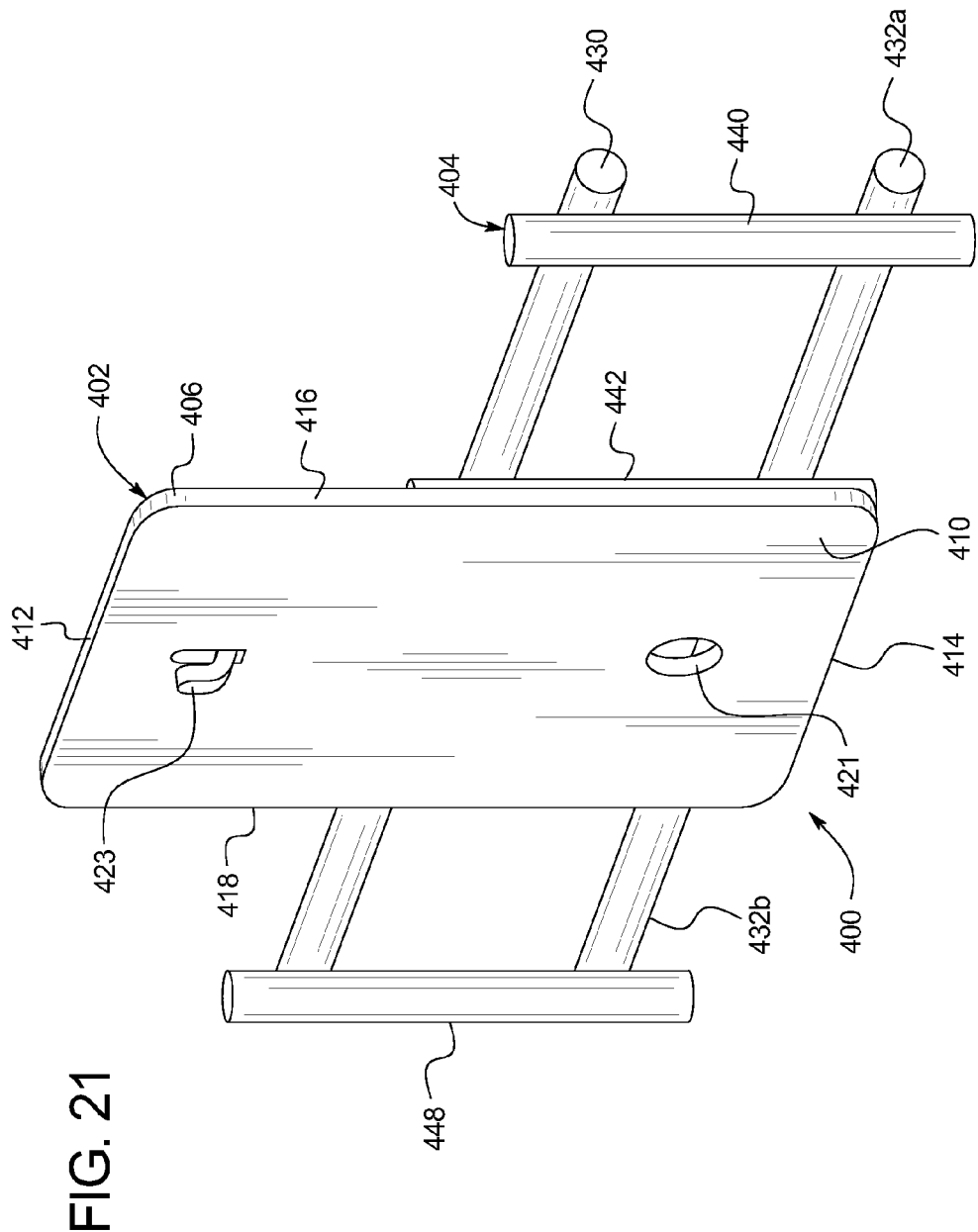
FIG. 21 is a rear perspective view of another embodiment of the vehicle wheel chock hanger of the present disclosure.

Turning now to FIG. 21, another embodiment of the vehicle wheel chock hanger, generally indicated by numeral 400, is configured to co-act with storage pan 70 to hold the vehicle wheel chock, such as chock 50, when the chock is not in use. This vehicle wheel chock hanger 400 is similar to vehicle wheel chock hanger 200 except for the replacement of the dimple and the inclusion of an attachment hook 423 extending from the exterior side of the mounting base 402. More specifically, vehicle wheel chock hanger 400 includes a mounting base 402 having a substantially flat substantially rectangular body 406 having an interior surface 408 (not shown), an exterior surface 410, a top edge 412, a bottom edge 414, a right side edge 416, and a left side edge 418. The body 406 defines an attachment hole, such as attachment slot 421, and the attachment hook 423 configured to facilitate attachment to the storage pan 70 and the side wall panel. The rack 404 generally includes a plurality of front grate engager holders 430, 432a, and 432b and a plurality of holder supports 440, 442, 446 (not shown), and 448 connected to the front grate engager holders 430, 432a, and 432b. In this illustrated embodiment, the holder supports 442 and 446 are suitably connected at spaced apart locations to the interior surface 408 of the mounting base 402. The front grate engager holder 430 is connected at spaced apart locations to the holder supports 440, 442, 446, and 448. The front grate engager holder 432a is connected at spaced apart locations to the holder supports 440 and 442. The front grate engager holder 432b is connected at spaced apart locations to the holder supports 446 and 448. It should be appreciated that the attachment hook 423 is configured to be positioned in a hole in the storage pan 70 to facilitate attachment to the storage pan 70.

It will be understood that modifications and variations may be effected without departing from the scope of the novel concepts of the present invention, and it is understood that this application is to be limited only by the scope of the claims.

The invention is claimed as follows:

1. An auto-rack railroad car vehicle wheel chock hanger comprising:
   a mounting base configured to be attached to a sidewall panel of an auto-rack railroad car, said mounting base including a flat substantially rectangular body having an interior surface, an exterior surface, a top edge, a bottom edge, a left side edge, and a right side edge, and defining a plurality of spaced apart attachment holes; and
   a rack connected to the interior surface of the mounting base and configured to hold multiple different chocks, each chock including a body having a front portion and a rear portion, a tire engaging assembly at the front portion of the body for engaging a tire of a vehicle in the auto-rack railroad car, front grate engagers connected to the front portion of the body, and a locking assembly connected to the rear portion of the body to secure the chock to a grating in the auto-rack railroad car and including rear grate engagers, said rack including:
   a plurality of horizontally or substantially horizontally extending front grate engager holders,
   a plurality of horizontally or substantially horizontally extending rear grate engager holders, and
   a plurality of holder supports, a plurality of said holder supports welded to the mounting base, said plurality of holder supports extending substantially parallel to the interior surface of the mounting base, said plurality of front grate engager holders welded to an interior surface of each of said holder supports, said plurality of rear grate engager holders welded to an interior surface of each of said holder supports, said plurality of front grate engager holders each extending substantially parallel to the interior surface of the mounting base, said plurality of rear grate engager holders each extending substantially parallel to the interior surface of the mounting base, and each front grate engager holder and each rear grate engager holder extending in a same or substantially same vertical plane.

2. The auto-rack railroad car vehicle wheel chock hanger of claim 1, wherein the mounting holes are slots.

3. The auto-rack railroad car vehicle wheel chock hanger of claim 1, wherein the body of the mounting base is flat and substantially rectangular.

4. The auto-rack railroad car vehicle wheel chock hanger of claim 1, which includes an additional holder support not welded to the mounting base, said additional holder support extending substantially parallel to the interior surface of the mounting base, each said rear grate engager holder welded to said additional holder support, each said front grate engager holder welded to said additional holder support.

5. The auto-rack railroad car vehicle wheel chock hanger of claim 1, which includes two spaced apart additional holder supports not welded to the mounting base, said additional holder supports each extending substantially parallel to the interior surface of the mounting base, each said rear grate engager holder welded to said additional holder supports, each said front grate engager holder welded to said additional holder supports.

* * * * *